United States Patent
Mysen et al.

(10) Patent No.: US 8,082,242 B1
(45) Date of Patent: Dec. 20, 2011

(54) CUSTOM SEARCH

(75) Inventors: Clarence Christopher Mysen, Santa Clara, CA (US); Naval Verma, Sunnyvale, CA (US); Johnny Chen, Mountain View, CA (US)

(73) Assignee: Google Inc., Mountain View, CA (US)

( * ) Notice: Subject to any disclaimer, the term of this patent is extended or adjusted under 35 U.S.C. 154(b) by 425 days.

(21) Appl. No.: 11/618,461

(22) Filed: Dec. 29, 2006

(51) Int. Cl.
*G06F 7/00* (2006.01)
*G06F 17/30* (2006.01)

(52) U.S. Cl. .................. 707/711; 707/713; 707/769

(58) Field of Classification Search .................. 707/1–4, 707/999.1–3, 711
See application file for complete search history.

(56) References Cited

U.S. PATENT DOCUMENTS

| | | | |
|---|---|---|---|
| 2006/0031206 A1* | 2/2006 | Deubel et al. ...................... | 707/3 |
| 2006/0195428 A1* | 8/2006 | Peckover ........................... | 707/3 |
| 2007/0016583 A1* | 1/2007 | Lempel et al. ..................... | 707/9 |
| 2007/0050393 A1* | 3/2007 | Vogel et al. ..................... | 707/102 |
| 2007/0233685 A1* | 10/2007 | Burns et al. ........................ | 707/9 |

OTHER PUBLICATIONS

"Yahoo Search Subscriptions Brings Premium Content Into Web Search"; http://blog.searchenginewatch.com; Jun. 16, 2005 (print date); 4 pages.

U.S. Appl. No. 11/618,327, filed Dec. 29, 2006 entitled "Custom Search Index", by Johnny Chen et al.; 36 pages + 13 pages of drawings.
U.S. Appl. No. 11/618,321, filed Dec. 29, 2006 entitled "Ranking Custom Search Results", by Clarence C. Mysen et al.; 37 pages + 17 pages of drawings.
U.S. Appl. No. 11/618,463, filed Dec. 29, 2006 entitled "Custom Content Provisioning", by Clarence C. Mysen et al.; 47 pages + 17 pages of drawings.
U.S. Appl. No. 12/209,996, filed Sep. 12, 2008 entitled "Custom Search Index Data Security", by Johnny Chen et al.; 51 pages + 23 pages of drawings.
U.S. Appl. No. 11/618,391, filed Dec. 29, 2006 entitled "Custom Content and Advertising", by Clarence C. Mysen et al.; 28 pages + 10 pages of drawings.
"Yahoo Search Subscriptions Brings Premium Content Into Web Search"; http://blog.searchenginewatch.com; Jun. 16, 2005 (print date); 4 pages.

* cited by examiner

*Primary Examiner* — Etienne Leroux
*Assistant Examiner* — Mohammad Rahman
(74) *Attorney, Agent, or Firm* — Harrity & Harrity, LLP

(57) ABSTRACT

A system may receive selection of one or more of a set of custom content groups, where each of the custom content groups is associated with a custom search index that is different from a web search index and a custom search index associated with another one of the custom content groups. The system may receive a search query from a user, perform a search of the web search index based on the search query to identify web search results, perform a search of one or more custom search indexes associated with the selected one or more the custom content groups to identify custom search results, generate a search result document that includes the web search results and the custom search results; and provide the search result document.

30 Claims, 22 Drawing Sheets

CUSTOM SEARCH

BACKGROUND

The World Wide Web ("web") contains a vast amount of information. Locating a desired portion of the information, however, can be challenging. This problem is compounded because the amount of information on the web and the number of new users inexperienced at web searching are growing rapidly. Search engines assist users in locating desired portions of this information by cataloging web pages. Typically, in response to a user's request, the search engine returns references to documents relevant to the request.

A web crawler is typically used to find and retrieve documents (e.g., web pages) on the web. To retrieve a document from the web, the web crawler sends a request to, for example, a web server for a document, downloads the entire document, and then provides the document to an indexer. The indexer typically takes the text of the crawled document, extracts individual terms from the text, and sorts those terms (e.g., alphabetically) into a search index. The web crawler and indexer repeat this process as the web crawler crawls documents across the web. Each entry in the search index contains a term stored in association with a list of documents in which the term appears and the location within the document's text where the term appears. The search index, thus, permits rapid access to documents that contain terms that match search terms of a user supplied search query. To improve search performance, the indexer typically ignores common words, called stop words (e.g., the, is, on, or, of, how, why, etc.) when creating or updating the search index. Existing indexers create a single search index that contains terms extracted from all documents crawled on the web.

Generally, search engines may base their determination of the user's interest on search terms (called a search query) entered by the user. The goal of the search engine is to identify links to high quality, relevant results (e.g., web pages) based on the search query using the search index. Typically, the search engine accomplishes this by matching the terms in the search query to terms contained in the search index, and retrieving a list of documents associated with each matching term in the search index. Documents that contain the user's search terms are considered "hits" and are returned to the user. The "hits" returned by the search engine may be ranked among one another by the search engine based on some measure of the quality and/or relevancy of the hits. A basic technique for sorting the search hits relies on the degree with which the search query matches the hits. For example, documents that contain every term of the search query or that contain multiple occurrences of the terms in the search query may be deemed more relevant than documents that contain less than every term of the search query or a single occurrence of a term in the search query and, therefore, may be more highly ranked by the search engine.

SUMMARY

According to one aspect, a method may include receiving selection of one or more of a set of custom content groups, where each of the custom content groups may be associated with a custom search index that is different from a web search index and a custom search index associated with another one of the custom content groups; receiving a search query from a user; performing a search of the web search index based on the search query to identify web search results; performing a search of one or more custom search indexes associated with the selected one or more the custom content groups to identify custom search results; generating a search result document that includes the web search results, the custom search results, and a plurality of advertisements, where at least one of the custom search results is included among the advertisements in the search result document; and providing the search result document.

According to another aspect, a system may include means for receiving selection of one or more of a set of custom content groups, where each of the custom content groups may be associated with a custom search index that is different from a web search index and a custom search index associated with another one of the custom content groups; means for receiving a search query; means for performing a search of the web search index based on the search query to identify web search results; means for performing a search of one or more custom search indexes associated with the selected one or more the custom content groups to identify custom search results, where one of the custom search results may include a for-pay search result that requires payment of a fee before access to the for-pay search result is permitted; means for generating a search result document that includes the custom search results commingled with the web search results, where the custom search results may include a first visual characteristic in the search result document, the web search results may include a second visual characteristic in the search result document, and the for-pay search result may include a third visual characteristic in the search result document, where the first, second, and third visual characteristics differ; and means for providing the search result document.

According to yet another aspect, a method may include receiving a request to subscribe to a custom content feed, where the custom content feed may identify a new content item that has been added to a custom search index, where the custom search index may be generated based on content uploaded or identified by a first user; periodically publishing the custom content feed, where the custom content feed may include one or more feed items corresponding to one or more new content items; receiving, from a second user, selection of one of the one or more feed items; and providing selective access to new content item corresponding to the selected feed item.

According to a further aspect, a method may include receiving, from a first user, a design of a custom content portal that provides access to a custom search index; receiving, from the first user, a set of criteria that may include at least one of criteria for selecting a result of searching the custom search index, criteria for scoring a result of searching the custom search index, or a criteria for presenting a result of searching the custom search index; receiving, from a second user, a search query via the custom content portal; performing a search of the custom search index based on the search query and the set of criteria to identify a set of search results; and presenting the set of search results.

BRIEF DESCRIPTION OF THE DRAWINGS

The accompanying drawings, which are incorporated in and constitute a part of this specification, illustrate one or more embodiments described herein and, together with the description, explain these embodiments. In the drawings.

DETAILED DESCRIPTION

Figure 1:
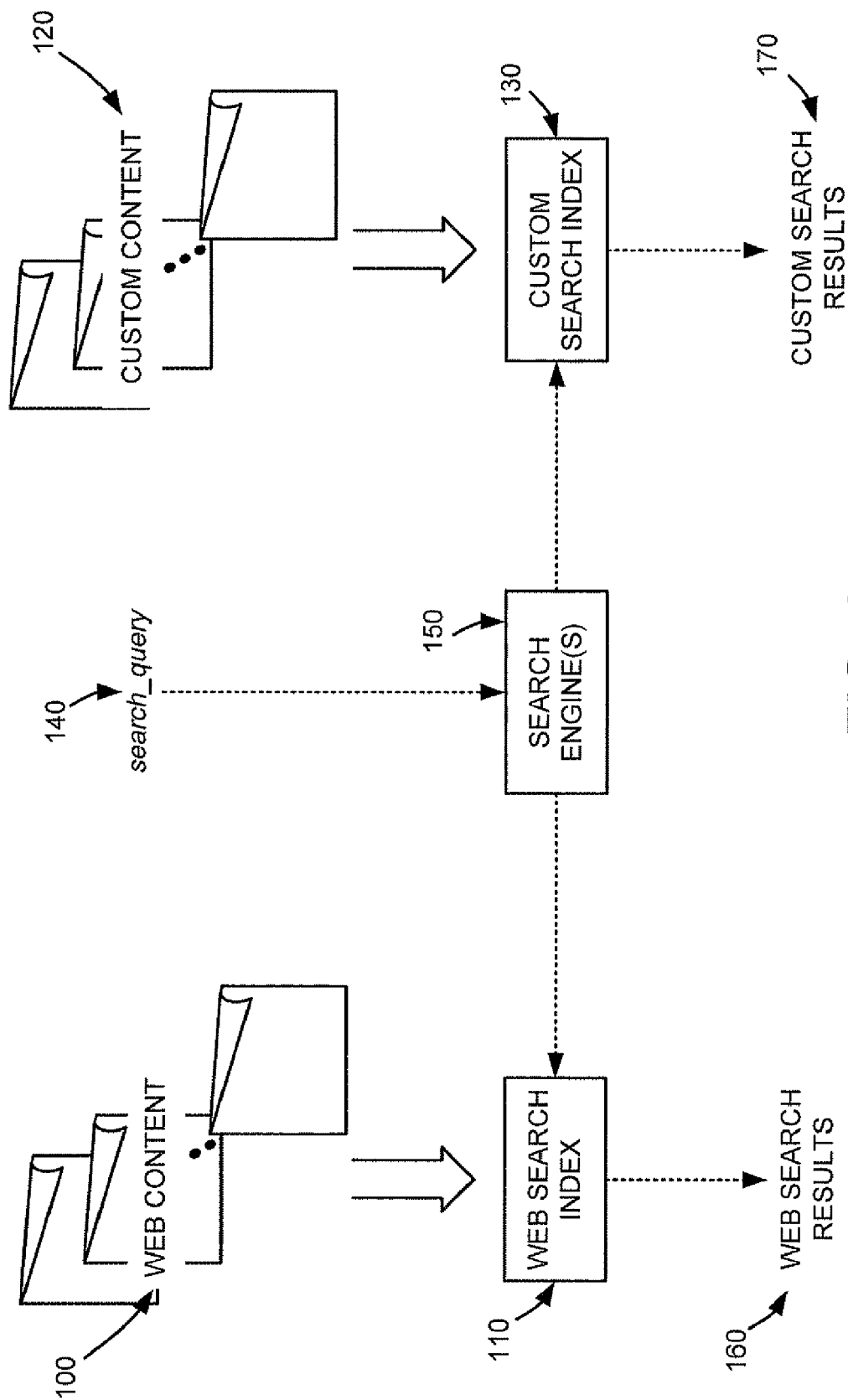
FIG. 1 is a diagram of an overview of an exemplary implementation described herein.

The following detailed description refers to the accompanying drawings. The same reference numbers in different drawings may identify the same or similar elements. Also, the following detailed description does not limit the invention.

Implementations described herein may permit a user to create their own corpora of customized content that may be accessed and searched by other users via a content searching service, such as, for example, Google Search. A content searching system may crawl the web to retrieve web content and then index the retrieved web content to create a web search index. One or more users may also upload or otherwise identify custom content to the content searching system, which may then index the custom content to create a custom search index that is different from the web search index. For example, the custom search index may store information different from the information stored by the web search index. In one implementation, the custom search index may store a subset of the information stored in the web search index. In this case, it may be possible for the custom search index to store pointers to information in the web search index. Alternatively, or additionally, the custom search index may store information that is not present in the web search index. Also, the custom search index may be considered different from the web search index in the sense that the custom search index may be searchable separate from the web search index.

Searching of custom content using the different custom search indexes may then be selectively permitted by users who may or may not have to be authenticated for the custom content that they wish to access and search.

Implementations described herein provide techniques for providing access to custom content and presenting search results relating to the custom content. Via these techniques, users can specify the type of custom content they desire and be presented with search results relating to this custom content in a meaningful way.

A "document," as the term is used herein, is to be broadly interpreted to include any machine-readable and machine-storable work product. A document may include, for example, an e-mail, a website, a business listing, a file, a combination of files, one or more files with embedded links to other files, a news group posting, a blog, an advertisement, a video, an image, a digital map, etc. In the context of the Internet, a common document is a web page. Documents often include textual information and may include embedded information (such as meta information, images, hyperlinks, etc.) and/or embedded instructions (such as Javascript, etc.).

"Content," as the term is used herein, is to be broadly interpreted to data that may or may not be in document form. Examples of content may include data associated with one or more documents, or data in one or more databases.

"Custom content," as that phrase is used herein, is to be broadly interpreted to include content that has been uploaded by a user for indexing and/or content identified by a user for indexing.

A "user," as that term is used herein, is to be broadly interpreted to include one or more people (e.g., a person, a group of people that may have some relationship (e.g., people associated with a business or organization), or a group of people with no formal relationship).

OVERVIEW

FIG. 1 is a diagram of an overview of an exemplary implementation described herein. As shown in FIG. 1, web content 100 may be retrieved using, for example, a web crawler (not shown). The web crawler may find and retrieve documents (e.g., web pages) stored on the web and extract content from the documents. For example, the web crawler may send a request to a web server for a document, download the entire document, and then provide the document to an indexer (not shown). The indexer may index the retrieved web content to create a web search index 110. The indexer extracts text from the content of the crawled document, extracts individual terms or other data from the text, and sorts those terms or other data (e.g., alphabetically) into web search index 110. Other techniques for extracting and indexing content, that are more complex than simple word-level indexing, may also be used, including techniques for indexing extensible markup language (XML) data, images, videos, etc. Each entry in web search index 110 may contain a term or other data stored in association with a list of documents in which the term or other data appears and the location within the document where the term or other data appears. Web search index 110 may subsequently be used to search for specific documents whose content matches a search query 140.

As further shown in FIG. 1, custom content 120 may also be obtained. Custom content 120 may include content uploaded by a user, content designated by the user as being part of its custom content (e.g., a user may designate one or more documents (e.g., web sites or web pages) to be included in the user's custom content), web content that is available only to selected subscribers via subscription, or other types of content that may be aggregated and indexed separately from web search index 110 (e.g., a user may designate documents (e.g., web sites or web pages) that contain content about a selected topic as being included in the user's custom content). An indexer (not shown) may index the obtained custom content to create a custom search index 130 that is different from web search index 110 (e.g., custom search index 130 may include information different from web search index 110 and/or custom search index 130 may be searchable separate from web search index 110). The indexer may take the text or other data from custom content 120, extract individual terms or other data from custom content 120, and sort those terms or other data (e.g., alphabetically) into custom search index 130. Other techniques for extracting and indexing content, that are more complex than simple word-level indexing, may also be used, including techniques for indexing XML data, images, videos, etc. Each entry in custom search index 130 may contain a term or other data stored in association with a location within custom content 120 where the term or other data appears. Custom search index 130 may subsequently be used to search for specific content of custom content 120 that matches a search query 140. Custom search index 130 may include multiple custom search indexes (not shown), each being associated with a different corpus of custom content.

Search engine(s) 150 may receive search query 140 and may selectively search either web search index 110 or custom search index 130 (or multiple different custom search indexes), or may search both web search index 110 and custom search index 130 (or other different custom search indexes), using search query 140. A search of web search index 110 by search engine(s) 150 may return web search results 160 that match search query 140. A search of custom search index 130 by search engine(s) 150 may return custom search results 170 that match search query 140. Web search results 160 and custom search results 170 may be represented together or separately with a search result document, as will be described below.

Exemplary Network Configuration

Figure 2:
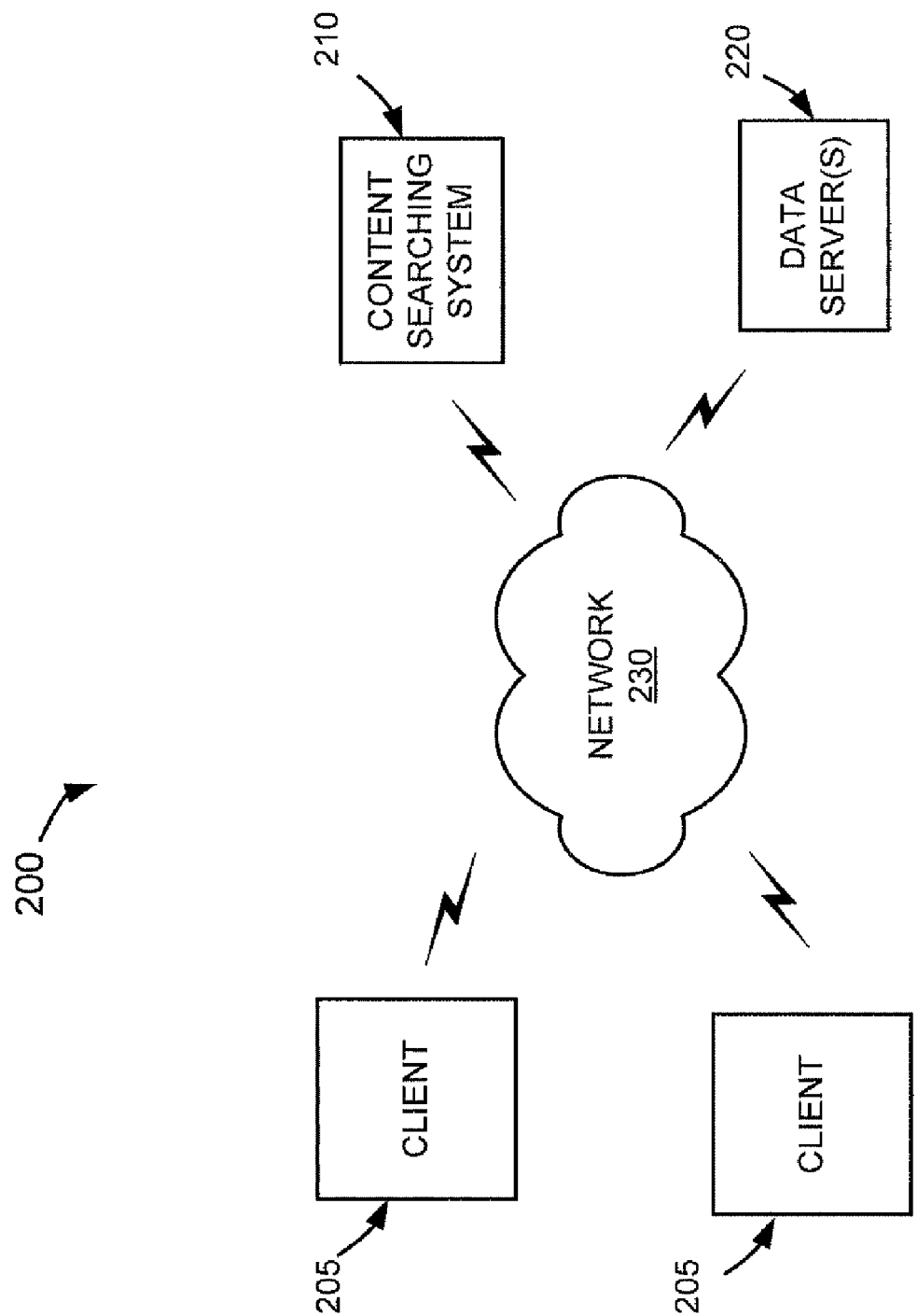
FIG. 2 is an exemplary diagram of a network in which systems and methods described herein may be implemented.

FIG. 2 is an exemplary diagram of a network 200 in which systems and methods described herein may be implemented. Network 200 may include multiple clients 205 connected to a content searching system 210 and data server(s) 220 via a network 230. Two clients 205, a single content searching system 210, and one or more data server(s) 220 have been illustrated as connected to network 230 for simplicity. In practice, there may be more or fewer clients, content searching systems, and data servers. Also, in some instances, a client 205 may perform one or more functions of content searching system 210 or server(s) 220, and/or content searching system 210 or a server 220 may perform one or more functions of a client 205.

Clients 205 may include client entities. An entity may be defined as a device, such as a personal computer, a wireless telephone, a personal digital assistant (PDA), a laptop, or another type of computation or communication device, a thread or process running on one of these devices, and/or an object executable by one of these devices. Clients 205 may implement a browser for browsing documents stored at data server(s) 220. Clients 205 may also use the browser for accessing content searching system 210 to search documents (e.g., web content) associated with data server(s) 220 and/or custom content, as described further below.

Data server(s) 220 may store or maintain documents that may be browsed by clients 205, or may be crawled by content searching system 210. Such documents may include data related to published news stories, products, images, user groups, geographic areas, or any other type of data. For example, data server(s) 220 may store or maintain news stories from any type of news source, such as, for example, the Washington Post, the New York Times, Time magazine, or Newsweek. As another example, server(s) 230 may store or maintain data related to specific products, such as product data provided by one or more product manufacturers. As yet another example, server(s) 230 may store or maintain data related to other types of web documents, such as pages of web sites (e.g., web content).

Content searching system 210 may include one or more hardware and/or software components that access, fetch, index, search, and/or maintain general web documents and/or custom content documents. Content searching system 210 may implement a data aggregation service by crawling a corpus of documents (e.g., web pages) hosted on data server(s) 220, indexing the documents, and storing information associated with these documents in a repository of crawled documents. The aggregation service may be implemented in other ways, such as by agreement with the operator(s) of data server(s) 220 to distribute their documents via the data aggregation service.

While content searching system 210 and server(s) 220 are shown as separate entities, it may be possible for content searching system 210 to perform one or more of the functions of one or more of servers 220, and vice versa. For example, it may be possible for content searching system 210 and one or more of servers 220 to be implemented as a single entity. It may also be possible for a single one of content searching system 210 or server(s) 220 to be implemented as two or more separate (and possibly distributed) devices.

Network 230 may include one or more networks of any type, including a local area network (LAN), a wide area network (WAN), a metropolitan area network (MAN), a telephone network, such as the Public Switched Telephone Network (PSTN) or a Public Land Mobile Network (PLMN), an intranet, the Internet, or a combination of networks. The PLMN(s) may further include a packet-switched sub-network, such as, for example, General Packet Radio Service (GPRS), Cellular Digital Packet Data (CDPD), or Mobile IP sub-network. Clients 205, content searching system 210, and server(s) 220 may connect to network 230 via wired and/or wireless connections.

Exemplary Content Searching System

Figure 3:
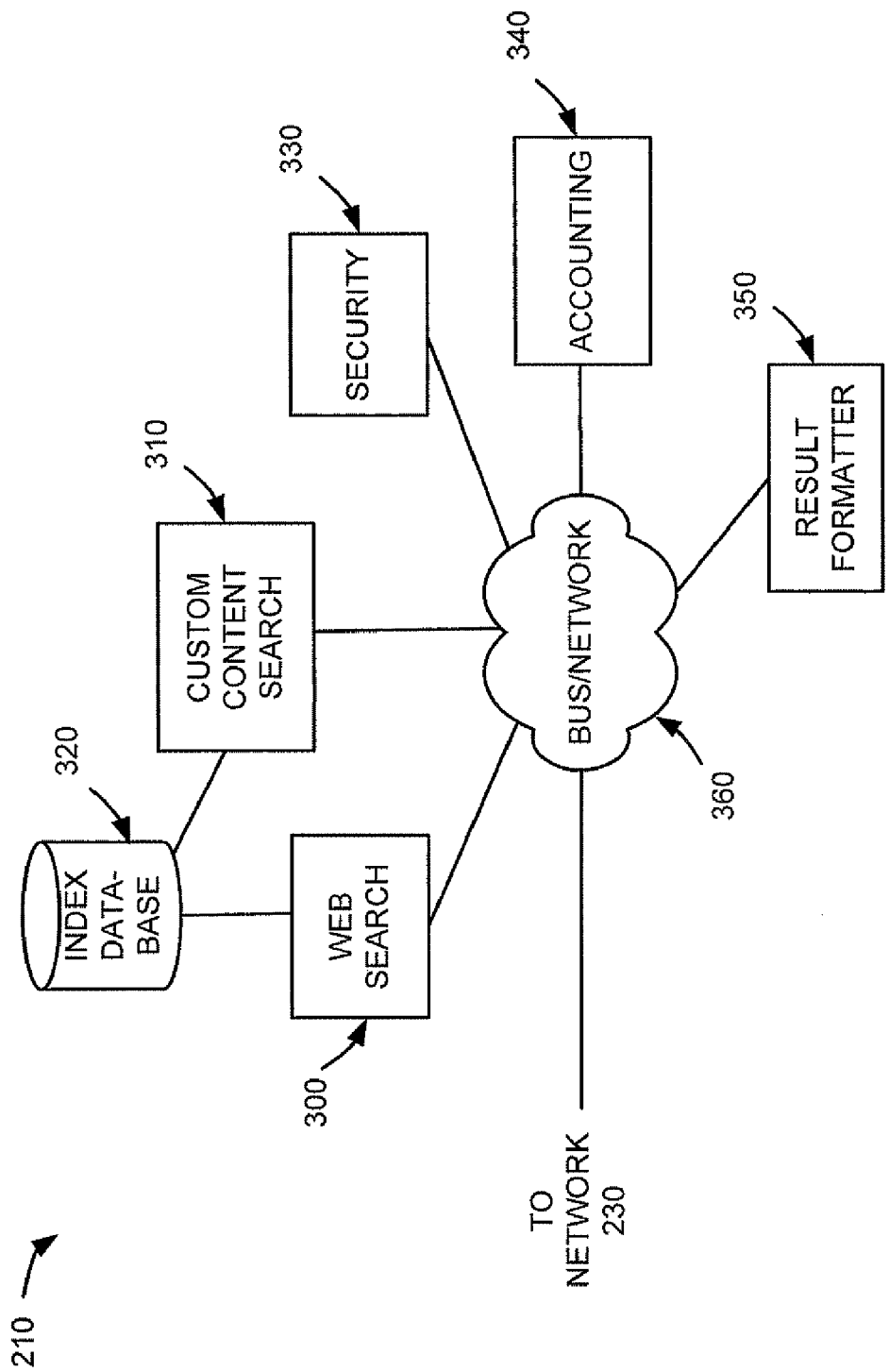
FIG. 3 is an exemplary diagram of the content searching system of FIG. 2.

FIG. 3 is an exemplary diagram of content searching system 210. As shown in FIG. 3, content searching system 210 may include a web search unit 300, a custom content search unit 310, an index database 320, a security unit 330, an accounting unit 340 and a result formatter 360 interconnected via a bus and/or network 360 with network 230. Web search unit 300, custom content search unit 310, security unit 330, accounting unit 340, and result formatter 350 may be implemented as software and/or hardware components within a single server entity, or as software and/or hardware applications distributed across multiple server entities.

Web search unit 300 may crawl documents (e.g., containing web content) stored at data server(s) 220, index the crawled documents to create a web search index 110, and search the crawled documents using the web search index. Custom content search unit 310 may obtain custom content, such as, for example, content uploaded from users, content designated by the user as being part of its custom content (e.g., the user may designate one or more documents (e.g., web sites or web pages) to be included in the user's custom content), content obtained from sources that require subscriptions for access to the content, and/or content on a given topic that may be obtained and aggregated from multiple sources (e.g., the user may designate one or more documents (e.g., web sites or web pages) that contain content about a selected topic as being included in the user's custom content), index the content in separate custom search indexes to create multiple different custom search indexes 130 and search the custom content using one or more of the different custom search indexes.

Index database 320 may store web search index 110 and one or more custom search indexes 130. Index database 320 may store web search index 110 and the one or more custom search indexes 130 as different data structures that may be searched independently of one another. Alternatively, index database 320 may store one or more custom search indexes 130 within the same data structure as web search index 110 in a manner that they may be searched independently of one another. Each of custom search indexes 130 may include multiple index entries, with each entry containing a term stored in association with an item of custom content in which the term appears, and a location within the custom content where the term appears. A custom search engine may search custom search indexes 130, based on a received search query, to match terms of the search query with terms contained in entries in custom search indexes 130.

Security unit 330 may authenticate users desiring to upload custom content to custom content search unit 310 and/or may authenticate users desiring to search one or more custom content indexes 130 associated with custom content. Security unit 330 may authenticate users by passing authentication tokens to the users which define the custom search indexes that are accessible by a particular user, and may contain security keys to permit encryption for sensitive information. Security unit 330 may authenticate users and authorize custom content search unit 310 to permit access to selected custom search indexes to the authenticated users.

Accounting unit 340 may establish and modify user access rights, may record and report user access to selected custom search indexes, may obtain feedback from users accessing given custom search indexes, and/or may track and control access to given custom search indexes based on whether users have subscribed to the custom search indexes. Users with administrative privileges (i.e., "owners" of corpora of custom content) may directly manage their custom content services via network 230 (e.g., modify their custom content, modify which users may access their custom content, etc.).

Result formatter 350 may return search results obtained from web search unit 300 and/or custom content search unit 310 in a formatted and organized manner. Result formatter 350 may combine custom content search results together with web content search results in a way that is meaningful to the user (e.g., in a hypertext markup language (HTML) page).

Bus and/or network 360 may include a communication path, such as, for example, a system bus or a network that permits web search unit 300, custom content search unit 310, security unit 330, accounting unit 340, and result formatter 350 to communicate with one another and with entities on network 230.

Exemplary Web Search Unit

Figure 4:
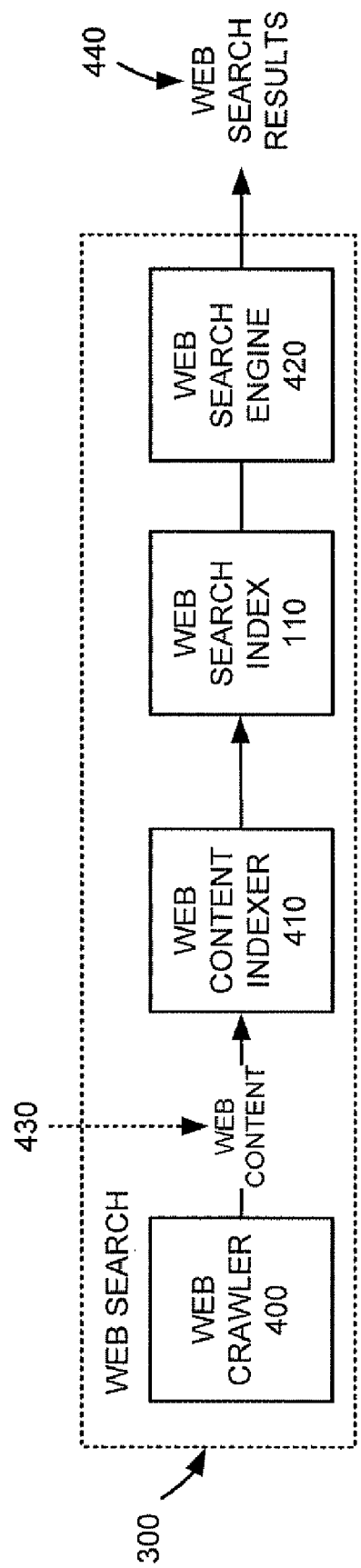
FIG. 4 is an exemplary diagram of the web search unit of FIG. 3.

FIG. 4 is an exemplary diagram of web search unit 300. As shown in FIG. 4, web search unit 300 may include a web crawler 400, a web content indexer 410, a web search index 110, and a web search engine 420.

Web crawler 400 may find and retrieve web content 430 (e.g., web documents) and provide the retrieved web content 430 to web content indexer 410. For example, web crawler 400 may send a request to a web server for a web document, download the entire web document, and then provide the web document to web content indexer 410. Web content indexer 410 may index web content 430 to create web search index 110. For example, web content indexer 410 may take the text or other data of a given crawled document, extract individual terms or other data from the text of the document, and sort those terms or other data (e.g., alphabetically) in web search index 110. Other techniques for extracting and indexing content, that are more complex than simple word-level indexing, may also be used, including techniques for indexing XML data, images, videos, etc. Each entry in web search index 110 may contain a term or other data stored in association with a list of documents in which the term or other data appears and the location within the document where the term or other data appears.

Web search engine 420 may search web search index 110, based on a received search query, to match terms of the search query with terms or other data (e.g., video, images, etc.) contained in entries in web search index 110. Web search engine 420 may retrieve a corresponding list of documents from each entry in web search index 110 that matches a term of the search query. The lists of documents retrieved from one or more entries in web search index 110 may be returned as web search results 440. In one implementation, each result of web search results 440 may include a uniform resource locator (URL) associated with a corresponding search result document and, possibly, a snippet of content extracted from the corresponding search result document.

Exemplary Custom Content Search Unit

Figure 5:
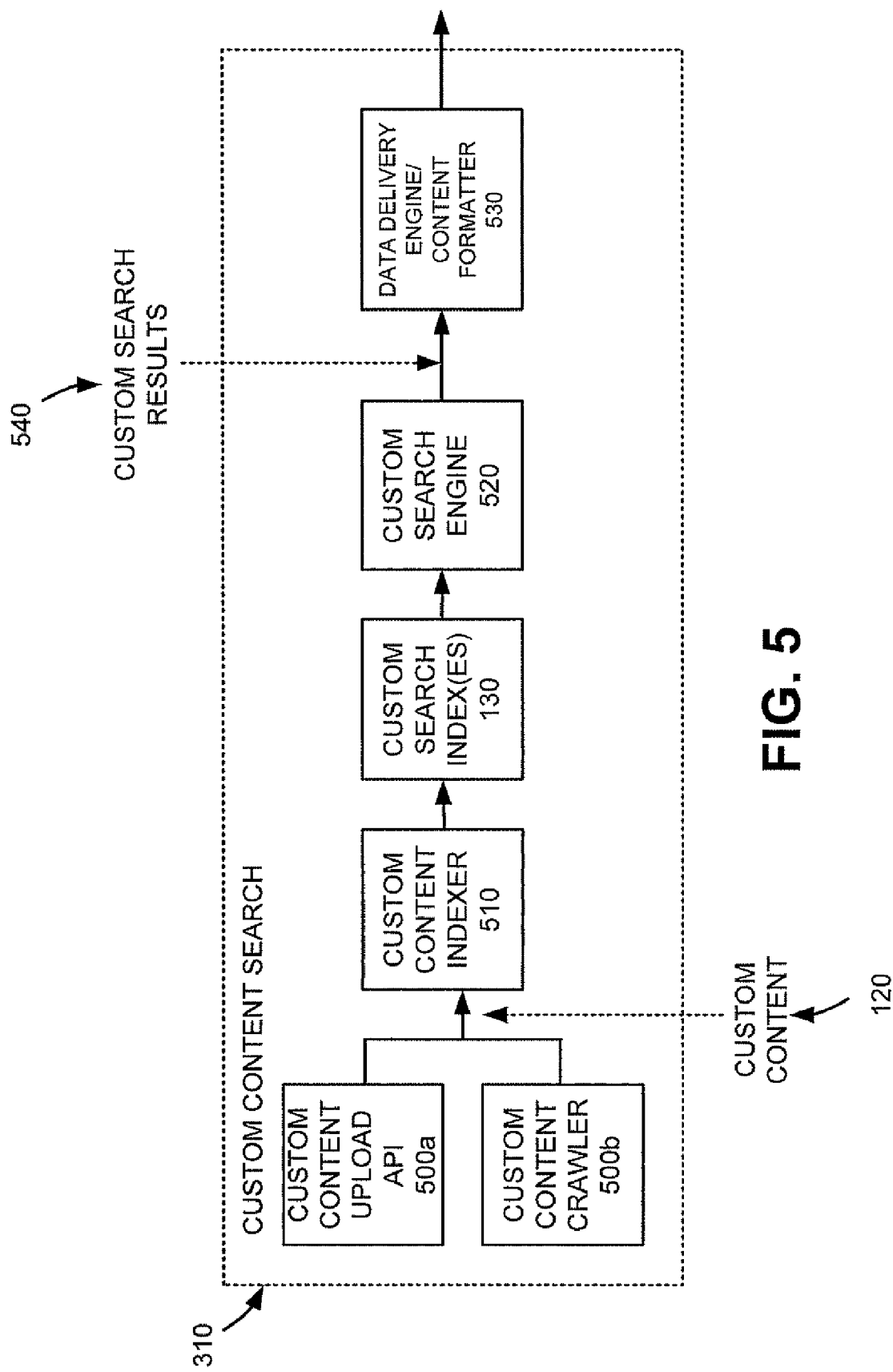
FIG. 5 is an exemplary diagram of the custom content search unit of FIG. 3.

FIG. 5 is an exemplary diagram of custom content search unit 310. As shown in FIG. 5, custom content search unit 310 may include a custom content upload Application Programmer Interface (API) 500a, a custom content crawler 500b, a custom content indexer 510, one or more custom search indexes 130, a custom search engine 520, and a data delivery engine/content formatter 530.

Custom content upload API 500a may receive custom content 120 uploaded from one or more users (e.g., one or more authenticated users). The uploaded content may include data of any type or format. In one implementation, the uploaded content may include meta-data (e.g., XML data). The meta-data may include content meta-data with pointers to actual content. In another implementation, custom content upload API 500a may include a translation engine for translating any type or format of uploaded data into a particular type or format of data that can be more easily processed by custom content indexer 510. Custom content upload API 500a may pass the received custom content 120 to custom content indexer 510.

Custom content crawler 500b may crawl specific content on the web or within one or more databases to retrieve documents that may be indexed in a corresponding custom search index 130. For example, custom content crawler 500b may crawl available documents on the web containing content directed to a specific topic (e.g., dogs, football, etc.) or documents identified by a user (e.g., the "owner" of a corpus of custom content). As an additional example, custom content crawler 500b may crawl documents similar to documents identified by the user as being part of the user's custom content. The user may, thus, designate content that may be grouped together and searched via the user's custom search index. Custom content crawler 500b may, in some implementations, need to be authenticated by content providers associated with specific custom content crawled on the web or within one or more databases. Custom content crawler 500b may pass the crawled custom content 120 to custom content indexer 510.

Custom content indexer 510 may index custom content 120 to create custom search index(es) 130. For example, custom content indexer 510 may take the text or other data of custom content 120, extract individual terms from the text or other data of custom content 120, and sort those terms or other data (e.g., alphabetically) into a single custom search index 130. Other techniques for extracting and indexing content, that are more complex than simple word-level indexing, may also be used, including techniques for indexing XML data, images, videos, etc. Each entry in a custom search index 130 may contain a term or other data stored in association with an item of content in which the term or other data appears and a location within the custom content where the term or other data appears.

Custom search engine 520 may search custom search index(es) 130, based on a received search query, to match terms of the search query with terms or other data contained in entries in custom search index(es) 130. If custom search index(es) 130 includes multiple different custom search indexes, then custom search engine 520 may search, based on the received search query and, possibly, user authentication, selected ones of the different custom search indexes. Custom search engine 520 may retrieve a corresponding list of items of custom content from each entry in custom search index 130 that matches a term of the search query. The lists of items of content retrieved from one or more entries in custom search index 130 may be returned as custom search results 540. In one implementation, each result of custom search results 540 may include a URL associated with a corresponding search result document and, possibly, a snippet of content extracted from the corresponding search result document.

Data delivery engine/content formatter 530 may receive the search results from custom search engine 520, format the search results into a meaningful data format (e.g., into an HTML document) that can be received and displayed by the user (e.g., via a web browser). Data delivery engine/content formatter 530 may customize the formatting of the search results (e.g., the content and visual format of the data) received from custom search engine 520 based on individual user preferences or based on the preferences of the custom content provider whose custom content is being searched.

Exemplary Index Database

Figure 6:
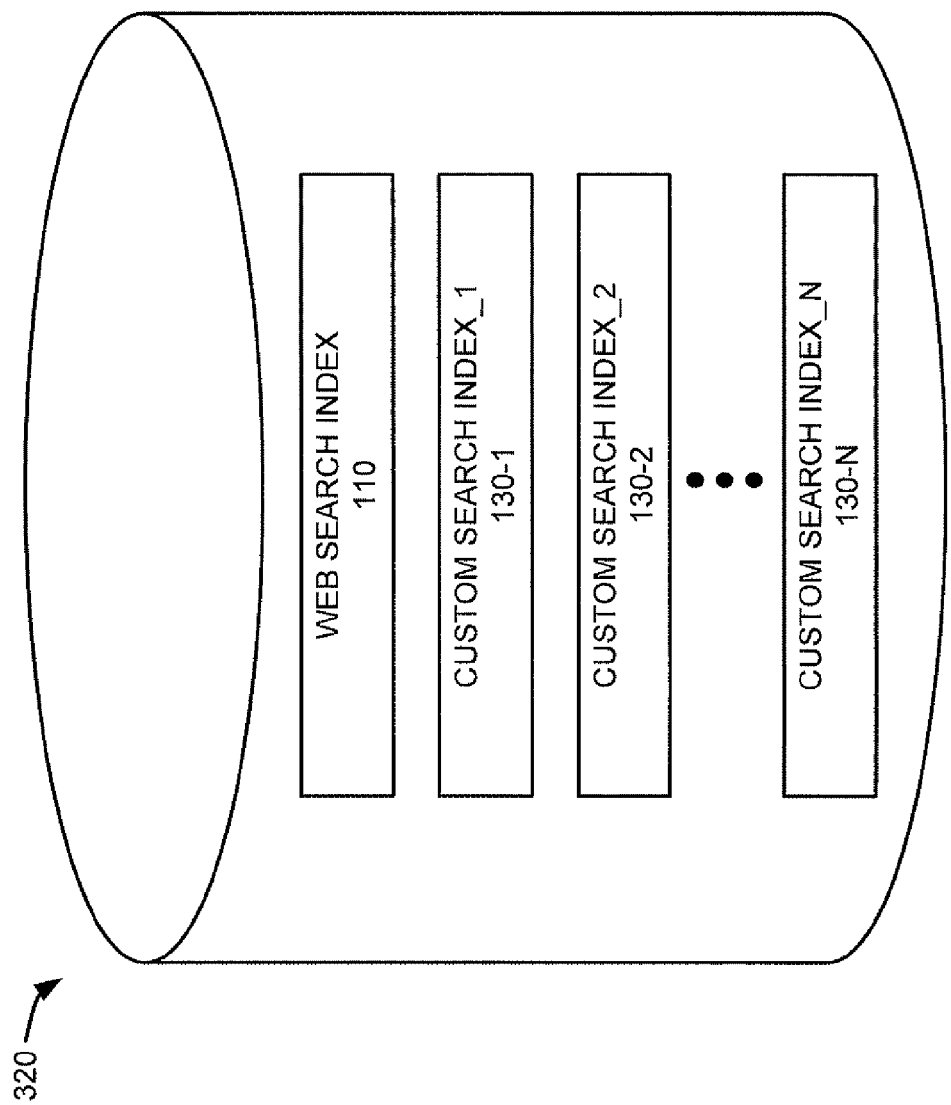
FIG. 6 is an exemplary diagram of the index database of FIG. 3.

FIG. 6 is an exemplary diagram of index database 320. As shown in FIG. 6, index database 320 may include a web search index 110 and one or more custom search indexes 130-1 through 130-N (wherein N≧1). In one implementation, custom search indexes 130-1 through 130-N may include data structures that are different from one another, and from web search index 110. Web search index 110 may include multiple entries, with each entry containing a term or other data stored in association with a list of documents in which the term or other data appears and the location within the document text where the term or other data appears. Web search engine 420 may search web search index 110 based on a received search query to match terms of the search query with terms or other data contained in entries of web search index 110.

Each one of custom search indexes 130-1 through 130-N may include multiple index entries, with each entry containing a term or other data stored in association with an item of custom content in which the term or other data appears and a location within the custom content where the term or other data appears. Custom search engine 520 may search custom search index(es) 130, based on a received search query, to match terms of the search query with terms or other data contained in entries in custom search index(es) 130.

Exemplary Content Searching Process

Figure 7A:
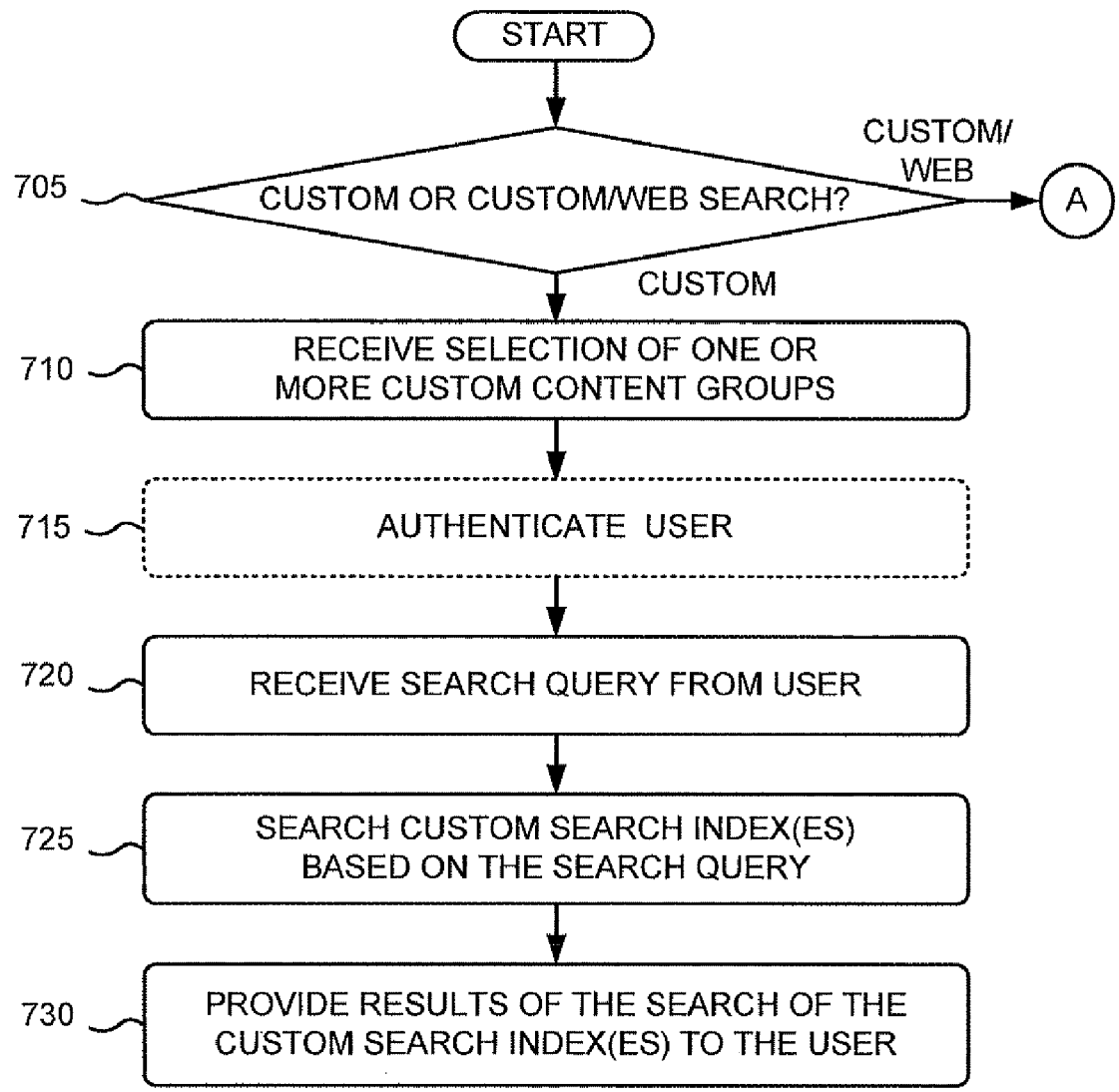
FIGS. 7A and 7B illustrate a flowchart of an exemplary process for providing custom content.
Figure 7B:
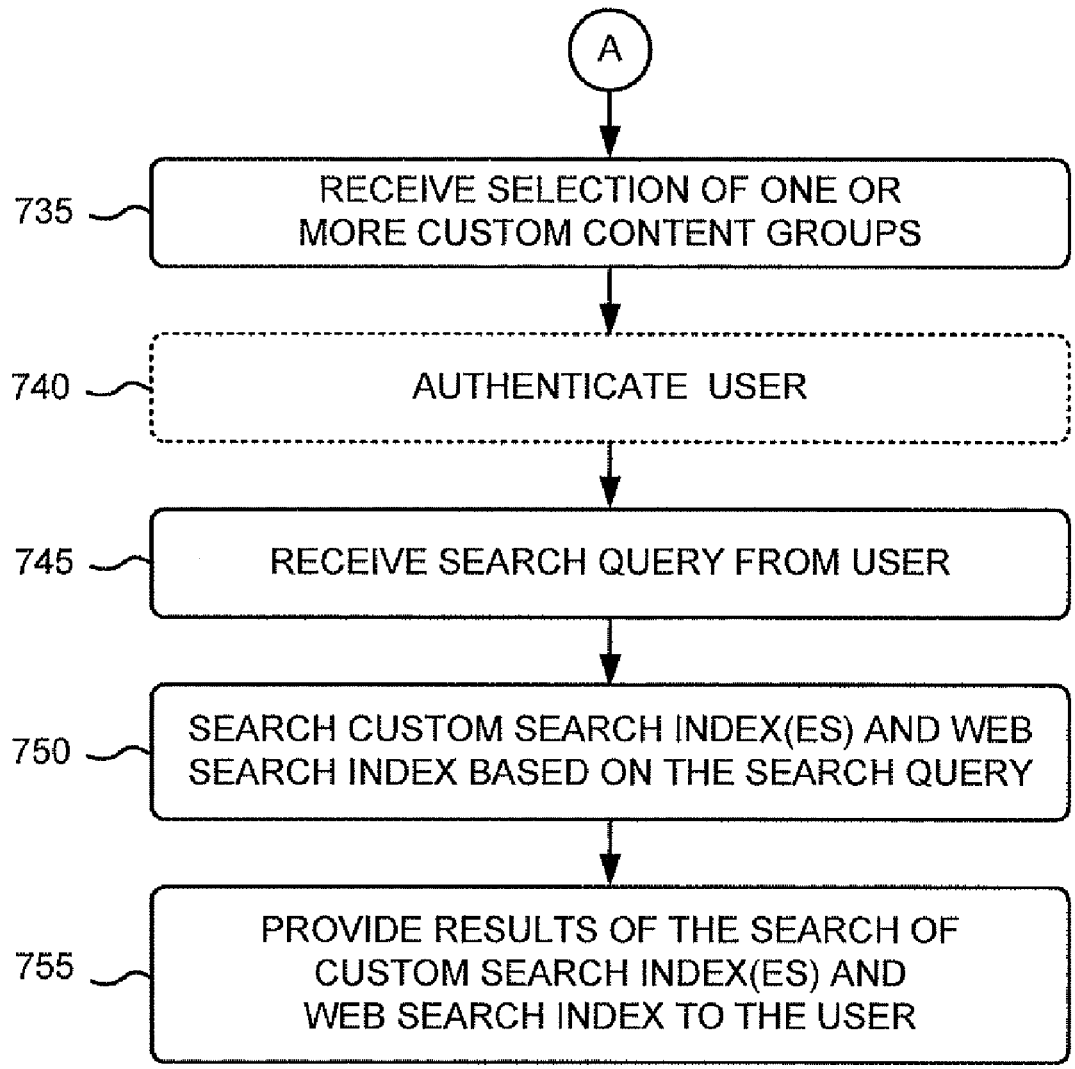

FIGS. 7A and 7B illustrate a flowchart of an exemplary process for providing custom content. The process exemplified by FIGS. 7A and 7B may be performed by content searching system 210.

Figure 8:
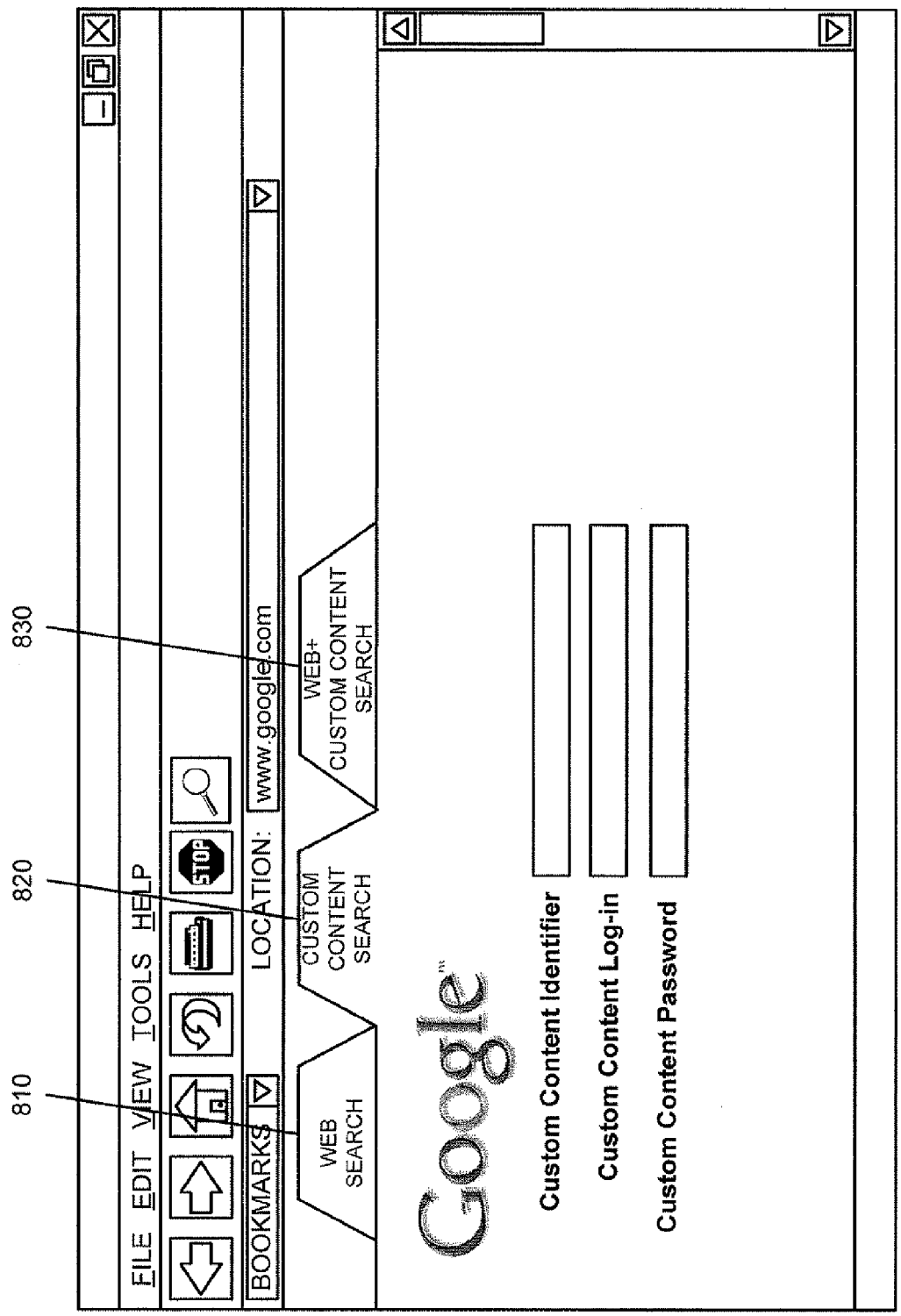
FIG. 8 is a diagram of an exemplary user interface that may permit a user to provide authentication information for accessing custom content.

The exemplary process may begin when a user expresses a desire to perform a search. Assume that the user desires to perform either a custom content search or a combined custom content and web search (also referred to as a "custom/web" search). It may be determined whether the user desires a custom content search or a custom/web search (block 705) (FIG. 7A). For example, content searching system 210 may provide a user interface via which the user may indicate the user's desire for a custom content search or a custom/web search. For example, in one implementation, as shown in FIG. 8, the user interface may present a set of selectable items (e.g., tabs), such as a web search tab 810 (for performing a web search), a custom content search tab 820 (for performing a custom content search), and a web+custom content search tab 830 (for performing a custom/web search). The user may select the tab corresponding to the type of search the user desires. In another implementation, content searching system 210 may provide separate user interfaces (e.g., search engine interfaces or portals) for a custom content search and a custom/web search. The user may access the appropriate user interface by, for example, entering an address (e.g., URL) associated with the user interface in an address box of a browser window. In yet another implementation, custom content searching system 210 may assume that the user desires to perform a custom/web search (searching the custom content that the user is permitted to access) unless the user expressly indicates a desire to the contrary (e.g., by identifying specific custom content that the user is interested in searching).

If the user expresses a desire for performing a custom content search (block 705-CUSTOM), then one or more custom content groups, corresponding to one or more custom search indexes 130, may be selected (block 710). In one implementation, selection of one or more custom content groups may be automatic. In this case, content searching system 210 may automatically select all of the custom content groups that the user is permitted to access. For example, a custom content group may require that a user subscribe to the custom content group before permitting the user to gain access to the custom content group or a particular piece of content in the custom content group. Another custom content group may require that the user pay a fee (e.g., one time, monthly, yearly, etc.) before permitting the user to gain access to the custom content group or a particular piece of content in the custom content group. Yet another custom content group may permit free access to all of its content.

In another implementation, content searching system 210 may present the user with a user interface for providing a custom content identifier that identifies one or more of the available custom content groups, as shown in FIG. 8. A custom content identifier may uniquely identify a single custom content group or, alternatively, a set of multiple custom content groups.

Figure 9:
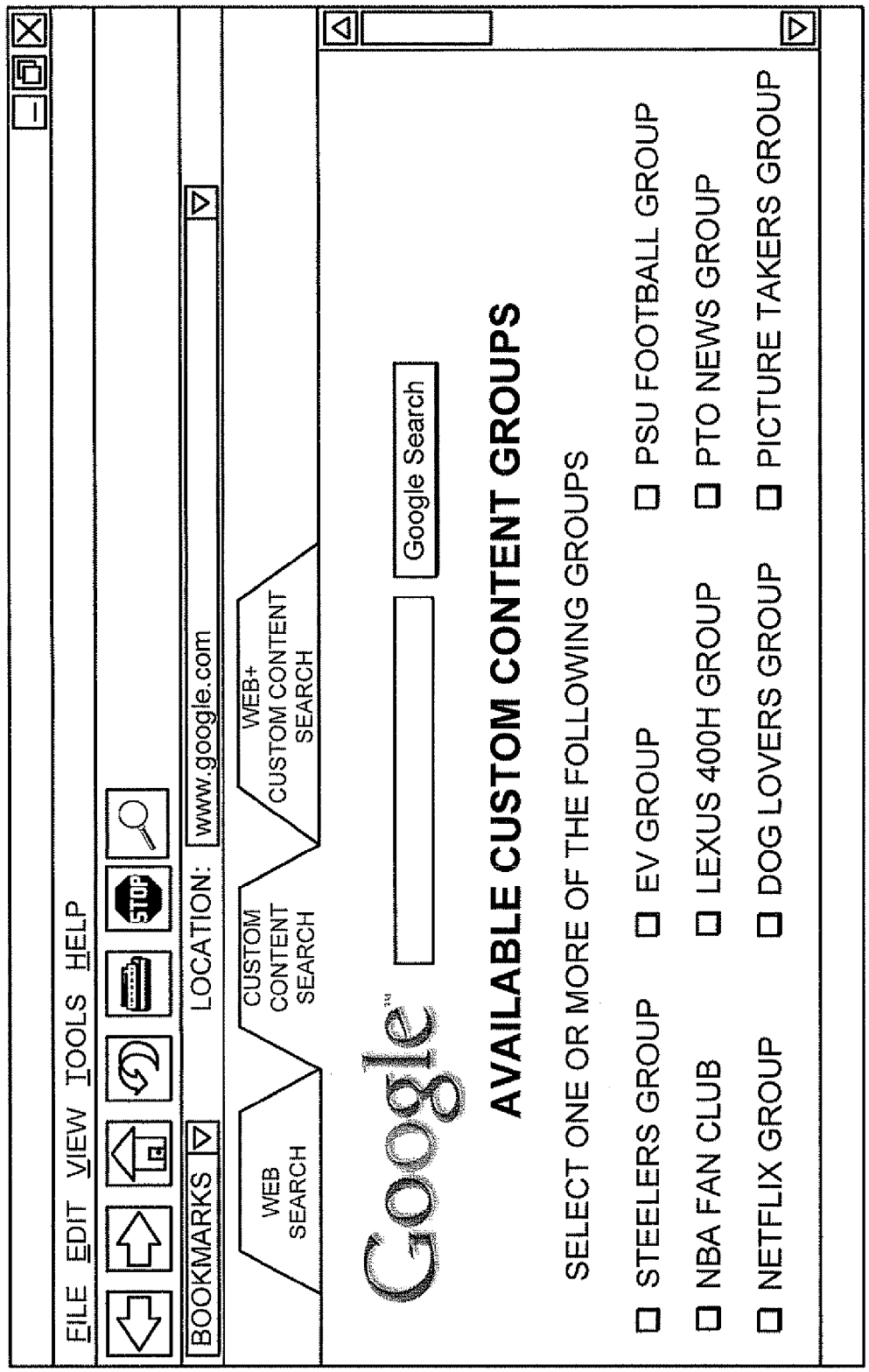
FIGS. 9 and 10 are diagrams of exemplary user interfaces for selecting custom content groups.

In yet another implementation, content searching system 210 may present the user with a list of available custom content groups from which the user may select one or more of the custom content groups to search, as shown in FIG. 9. In one embodiment, content searching system 210 may present the user with only those custom content groups that the user is permitted to access. In another embodiment, content searching system 210 may present the user with a list of all available custom content groups.

Figure 10:
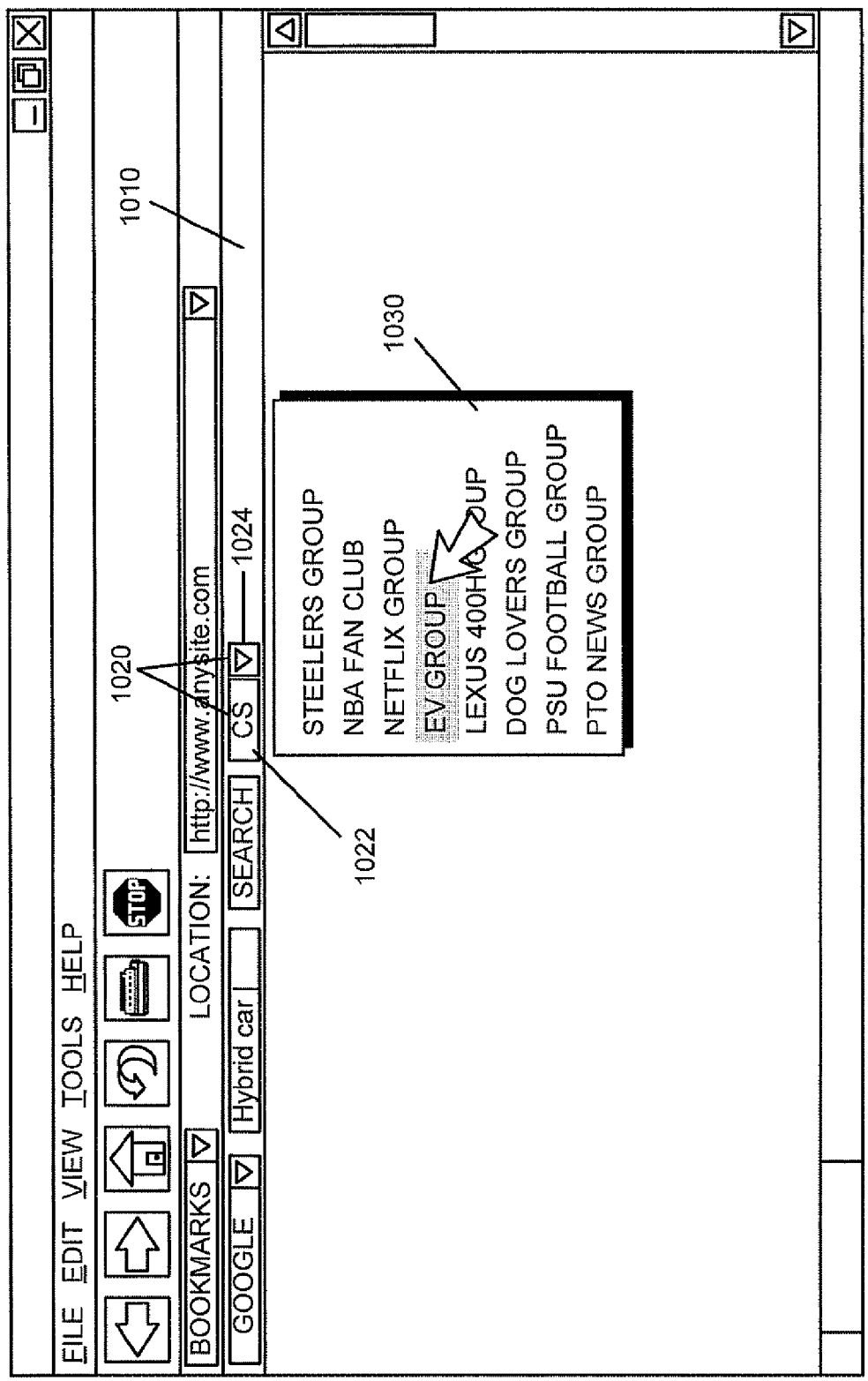

In a further implementation, the user may be presented with a list of available custom content groups via a toolbar 1010 of a browser application, as shown in FIG. 10. Toolbar 1010 may include a plug-in, an applet, a dynamic link library (DLL), or another type of executable object or process. As shown in FIG. 10, toolbar 1010 may include a custom search (CS) button 1020 that is selectable by a user using, for example, a pointing device. In one implementation, custom search button 1020 may include an icon portion 1022 and/or a menu portion 1024. Icon portion 1022 may include an icon that, when selected, may cause a user interface similar to the user interface shown in FIG. 9 to be presented to the user. Menu portion 1024 may permit a menu 1030 to be presented when menu portion 1024 is selected (e.g., by clicking or hovering over) by the user. In one embodiment, menu 1030 may include a list of custom content groups available to the user (e.g., just those custom content groups the user is permitted to access, all available custom content groups, or a subset of the available custom content groups). In another embodiment, menu 1030 may include information from a data feed, such as new content that has been added to a custom content group.

Optionally, the user may be authenticated (block 715). To authenticate the user, when necessary, content searching system 210 may present the user with a user interface for providing log-in information, such as a custom content log-in (e.g., username) and custom content password, as shown in FIG. 8. Content searching system 210 may maintain a set of usernames, passwords, and information regarding the custom content groups for which the users have subscribed. When a user provides a custom content log-in and a custom content password for a particular custom content group, content searching system 210 may verify that the information that the user provided matches the information that it maintains. If the information does not match, then the user may be denied access to the particular custom content group and, therefore, not permitted to perform the search that the user desires. If the information matches, however, then the user may be properly authenticated. As a result of the above analysis, content searching system 210 may determine whether the user is permitted access to each of the one or more custom content groups that were selected by the user.

In another implementation, authentication of the user may have occurred at some prior point in time. For example, a user may have logged into content searching system 210 for some other reason (e.g., to perform a search during a prior search session, to check e-mail, to access an online calendar, to access an instant messenger, or for some other service offered by content searching system 210). In this case, user authentication may not need to occur again.

Figure 11:
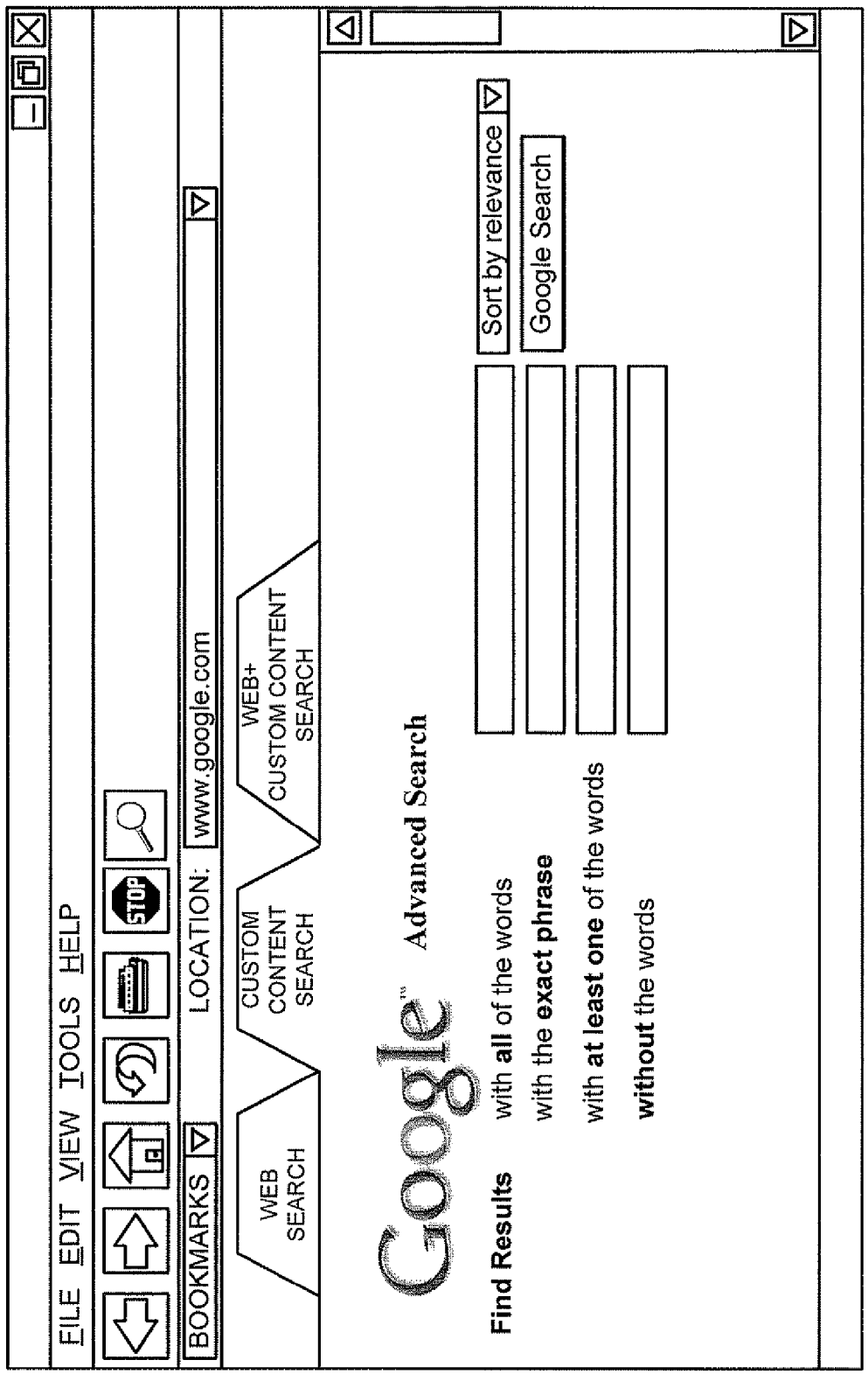
FIG. 11 is a diagram of an exemplary user interface that may permit a user to enter search terms of a search query.

A search query may be received (block 720). For example, content searching system 210 may present the user with a user interface that permits the user to provide one or more search terms and possibly specify other criteria for a search query, as shown in FIG. 11.

A search may be performed on the one or more custom search indexes 130 based on the search query (block 725). For example, content searching system 210 may search each of the one or more search indexes 130 that it has been determined that the user is permitted to access to identify documents that are relevant to the search query. A document may be considered relevant to the search query when text or other data of the document matches one or more terms of the search query.

Figure 12A:
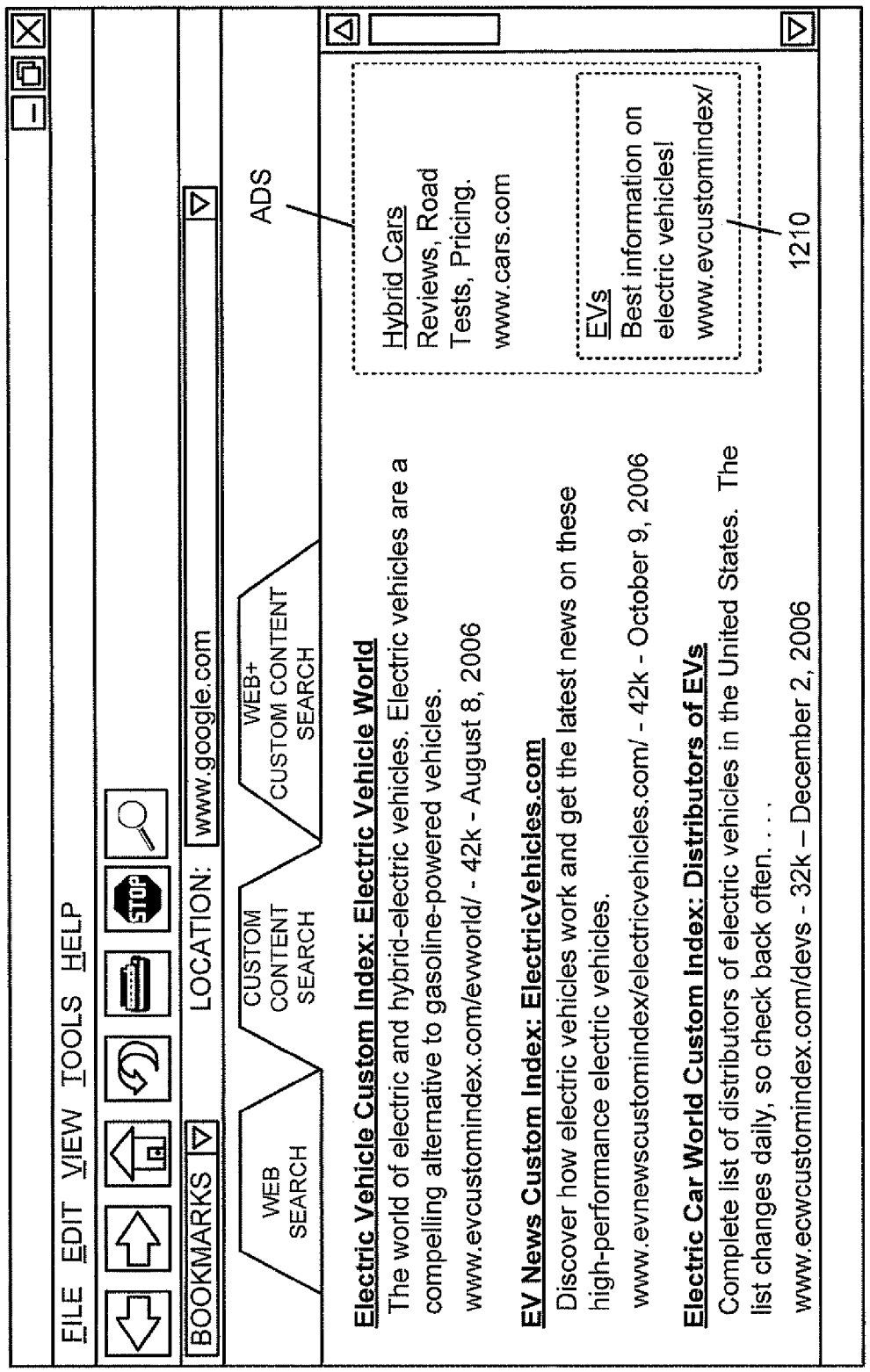
FIGS. 12A-12D are diagrams of examples of ways that custom content search results may be presented.

Results of the search of the one or more custom search index(es) 130 may be provided to the user (block 730). For example, content searching system 210 may score the search results based, for example, on a match of the search query terms to terms or other data in the documents of the search results, previous selections (e.g., clicks or purchases) of the search results by this user or a group of users, or other techniques that may predict the usefulness of the search results. Content searching system 210 may order the search results based on their scores, generate a search result document (e.g., a HTML document) based on the ordered search results, and send the search result document to the user. As shown in FIG. 12A, the search results in the search result document may include a title, a snippet, and other information regarding the search results. The search result document, presented to the user, may also include one or more advertisements (ads), as shown in FIG. 12A.

For-pay custom content (i.e., content that the user must pay to access) may be presented in a section of the search result document separate from the other custom content. Alternatively, or additionally, for-pay custom content may be included with the ads, as shown as 1210 in FIG. 12A. In other words, an ad 1210 presented within the search result document may include custom content, such as for-pay or subscription-based custom content.

If the user expresses a desire for performing a custom/web search (block 705-CUSTOM/WEB), then one or more custom content groups, corresponding to one or more custom search indexes 130, may be selected (block 735) (FIG. 7B). In one implementation, selection of one or more custom content groups may be automatic. In this case, content searching system 210 may automatically select all of the custom content groups that the user is permitted to access. In another implementation, content searching system 210 may present the user with a user interface for providing a custom content identifier that identifies one or more of the available custom content groups, as described above with regard to FIG. 8. In yet another implementation, content searching system 210 may present the user with a list of available custom content groups from which the user may select one or more of the custom content groups to search, as described above with regard to FIG. 9. In a further implementation, the user may be presented with a list of available custom content groups via a toolbar 1010 of a browser application, as described above with regard to FIG. 10.

Optionally, the user may be authenticated (block 740). To authenticate the user, when necessary, content searching system 210 may present the user with a user interface for providing log-in information, such as a custom content log-in (e.g., username) and custom content password, as described above with regard to FIG. 8. In another implementation, authentication of the user may have occurred at some prior point in time, as described above.

A search query may be received (block 745). For example, content searching system 210 may present the user with a user interface that permits the user to provide one or more search terms and possibly specify other criteria for a search query, as described above with regard to FIG. 11.

A search may be performed on the one or more custom search indexes 130 and web search index 110 based on the search query (block 750). For example, content searching system 210 may search each of the one or more search indexes 130 that it has been determined that the user is permitted to access to identify documents that are relevant to the search query. Content searching system 210 may separately search web search index 110 to identify documents that are relevant to the search query. A document may be considered relevant to the search query when text or other data of the document matches one or more terms of the search query.

Results of the search of custom search index(es) 130 and web search index 110 may be provided to the user (block 755). For example, content searching system 210 may score the search results. In one implementation, content searching system 210 may use different criteria to score a custom content search result and a web search result. A custom content search result and a web search result may be scored based, for example, on a match of the search query terms to terms or other data in the documents of the search result, previous selections (e.g., clicks or purchases) of the search result by this user or a group of users, or other techniques that predict the usefulness of the search result. A web search result may also be scored based on link-based criteria, which might not be useful for scoring custom content search results because the documents in the custom content groups may not have a good link structure.

Figure 12B:
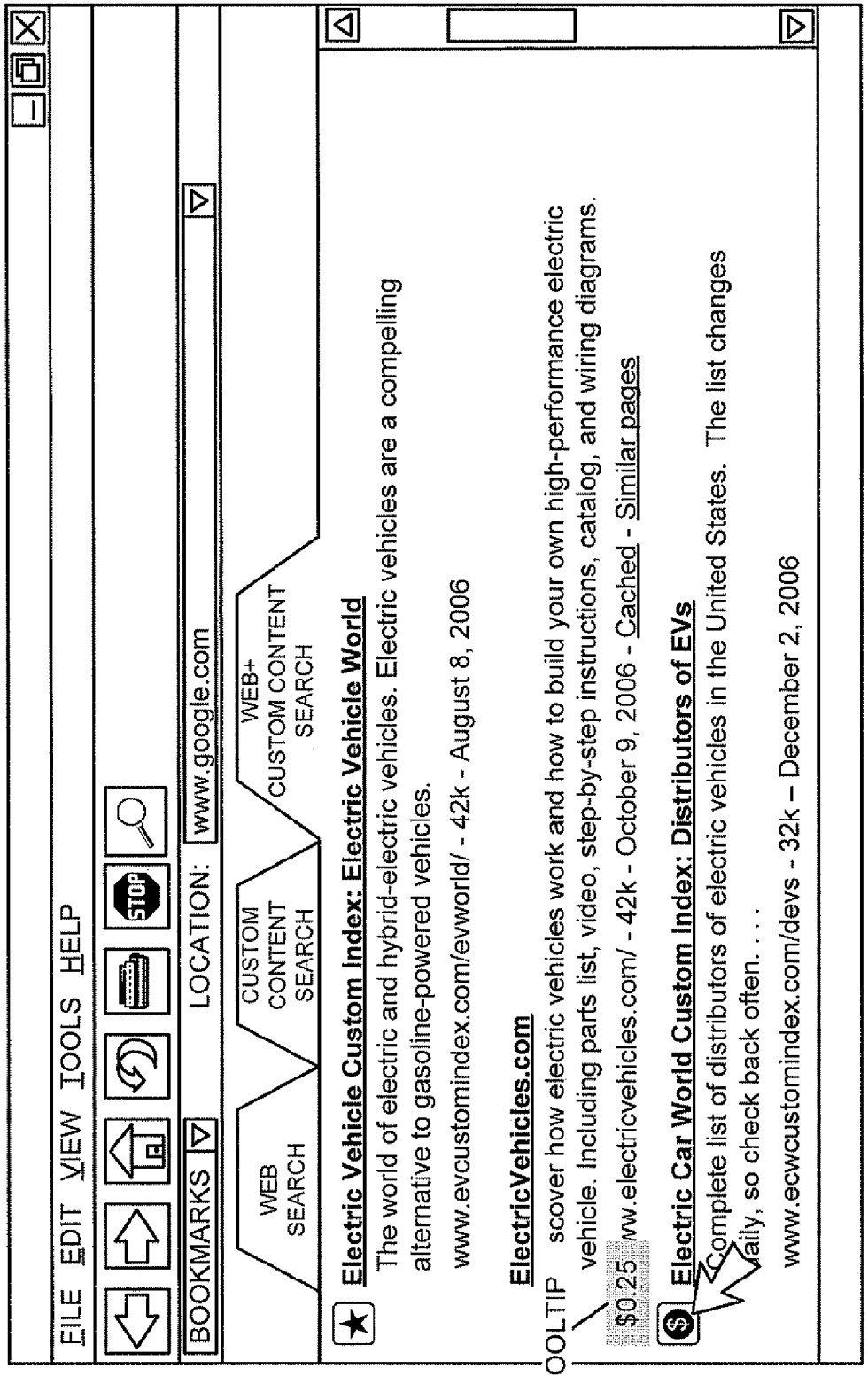

In one implementation, content searching system 210 may commingle the custom content search results and the web search results, as shown in FIG. 12B. For example, content searching system 210 may order the search results (custom content search results and web search results) based on their scores, generate a search result document (e.g., a HTML document) based on the ordered search results, and send the search result document to the user. As shown in FIG. 12B, the custom content search results may be visually distinguished (e.g., may include a different visual characteristic) from the web search results. For example, a custom content search result may include an icon (a star or a dollar sign, as shown in FIG. 12B) or some other information to identify the search result as a custom search result or to identify the source of the custom search result (e.g., which custom content group with which the custom search result is associated), or may be formatted differently from the web search results. A for-pay search result may include an icon different from free search results (e.g., a dollar sign versus a star in FIG. 12B) or may be formatted different from free search results. In one implementation, as shown in FIG. 12B, placing a cursor over the icon of a for-pay search result may cause a tooltip to be presented that shows the price for accessing the for-pay search result. The search result document, presented to the user, may also include one or more ads (not shown in FIG. 12B).

Figure 12C:
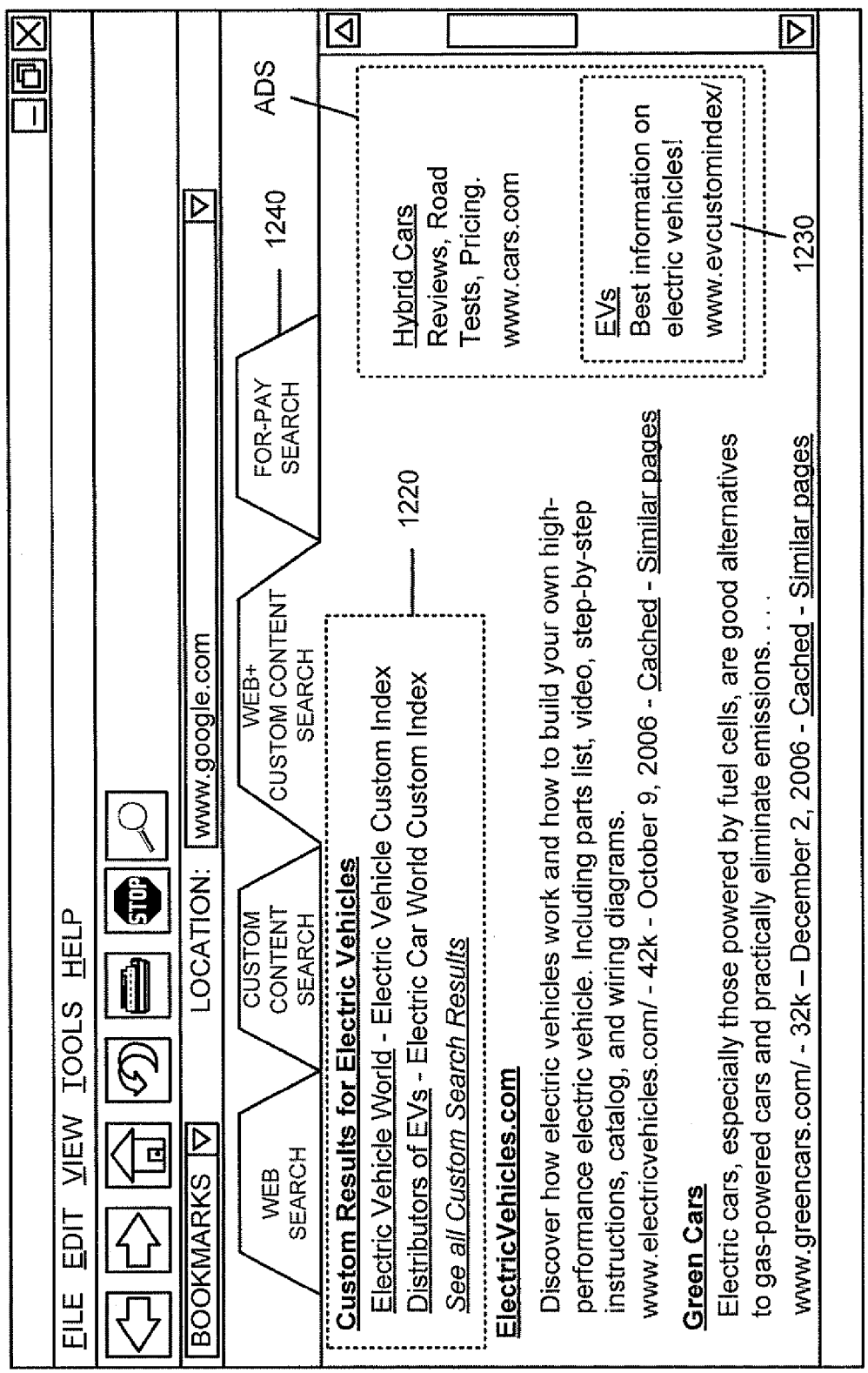

In another implementation, content searching system 210 may segregate the custom content search results from the web search results, as shown in FIG. 12C. For example, content searching system 210 may order the custom search results based on their scores, order the web search results based on their scores, generate a search result document (e.g., a HTML document) based on the ordered custom search results and the ordered web search results, and send the search result document to the user. As shown as 1220 in FIG. 12C, the custom content search results may be separated from the web search results. In one embodiment, a predetermined number of the custom content search results may be presented with a link to other ones of the custom content search results. For-pay search results may be presented in a few different ways. For example, for-pay search results may be provided alongside the ads, as shown as 1230 in FIG. 12C. Alternatively, or additionally, a separate tab may be presented within the user interface (e.g., a for-pay search tab 1240 as shown in FIG. 12C). The user may access for-pay search tab 1240 to view the for-pay search results.

Figure 12D:
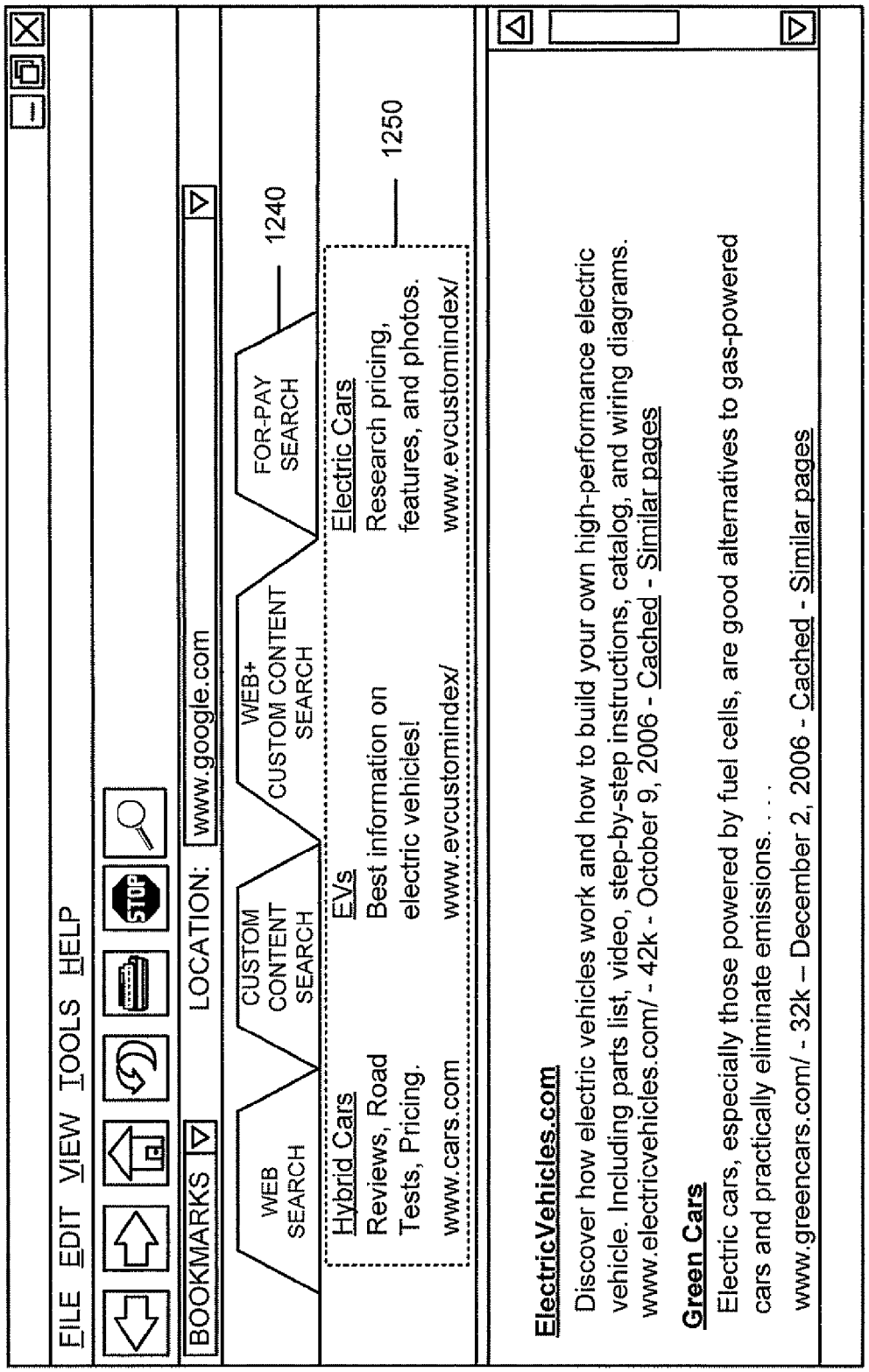

In yet another implementation, content searching system 210 may segregate the custom content search results from the web search results, as shown in FIG. 12D. For example, content searching system 210 may order the web search results based on their scores, generate a search result document (e.g., a HTML document) based on the ordered web search results, and send the search result document to the user. As shown as 1250 in FIG. 12D, the custom content search results may be integrated with the ads in a separate location from the web search results. For-pay search results may be presented with the other custom content search results among the ads or via a separate tab (e.g., a for-pay search tab 1240 as shown in FIG. 12D).

Custom Content Via Data Feeds

Figure 13:
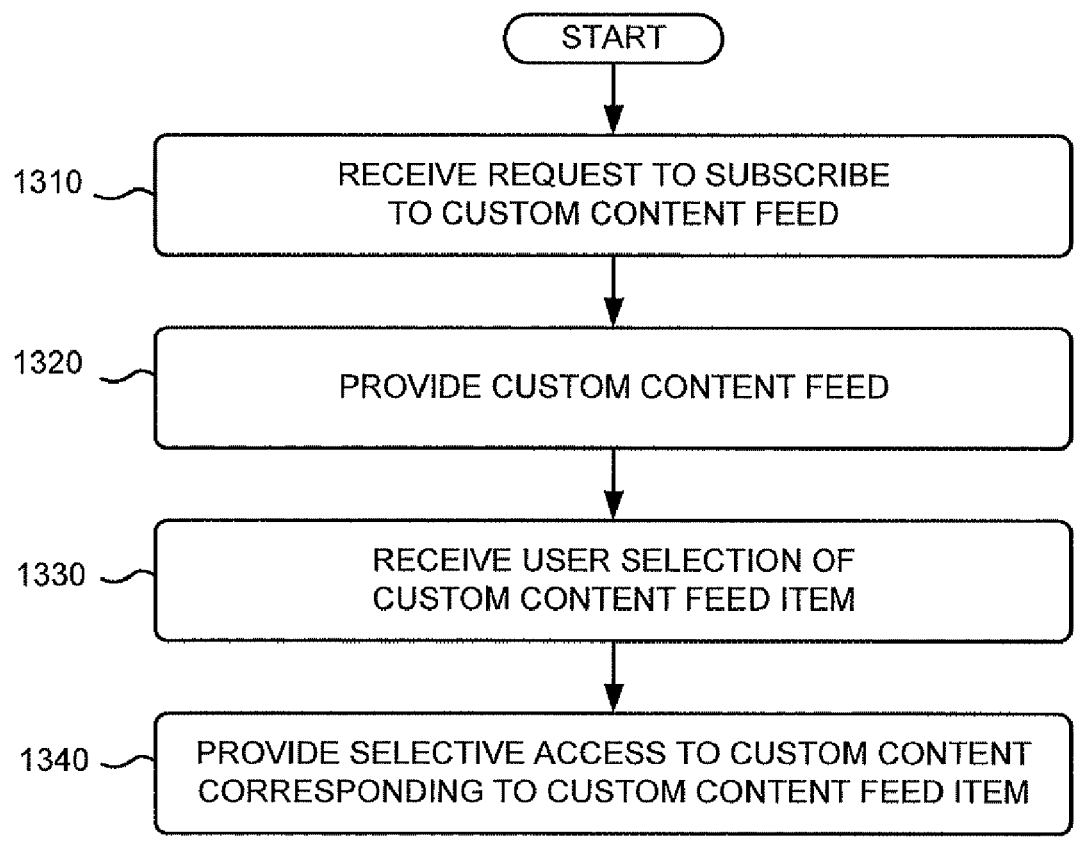
FIG. 13 illustrates a flowchart of an exemplary process for providing access to custom content via a custom content feed.

Techniques have been described above for obtaining and presenting custom content. In another implementation, custom content may be obtained via a data feed. FIG. 13 illustrates a flowchart of an exemplary process for providing access to custom content via a data feed (also referred to as a "custom content feed"). The process exemplified by FIG. 13 may be performed by content searching system 210.

In this implementation, content searching system 210 may provide a custom content feed with titles and/or snippets of new content added to one or more of custom search indexes 130. The custom content feed may take the form of a really simple syndication (RSS) or an atom-like feed. Content searching system 210 may permit users to subscribe to the custom content feed.

Figure 14:
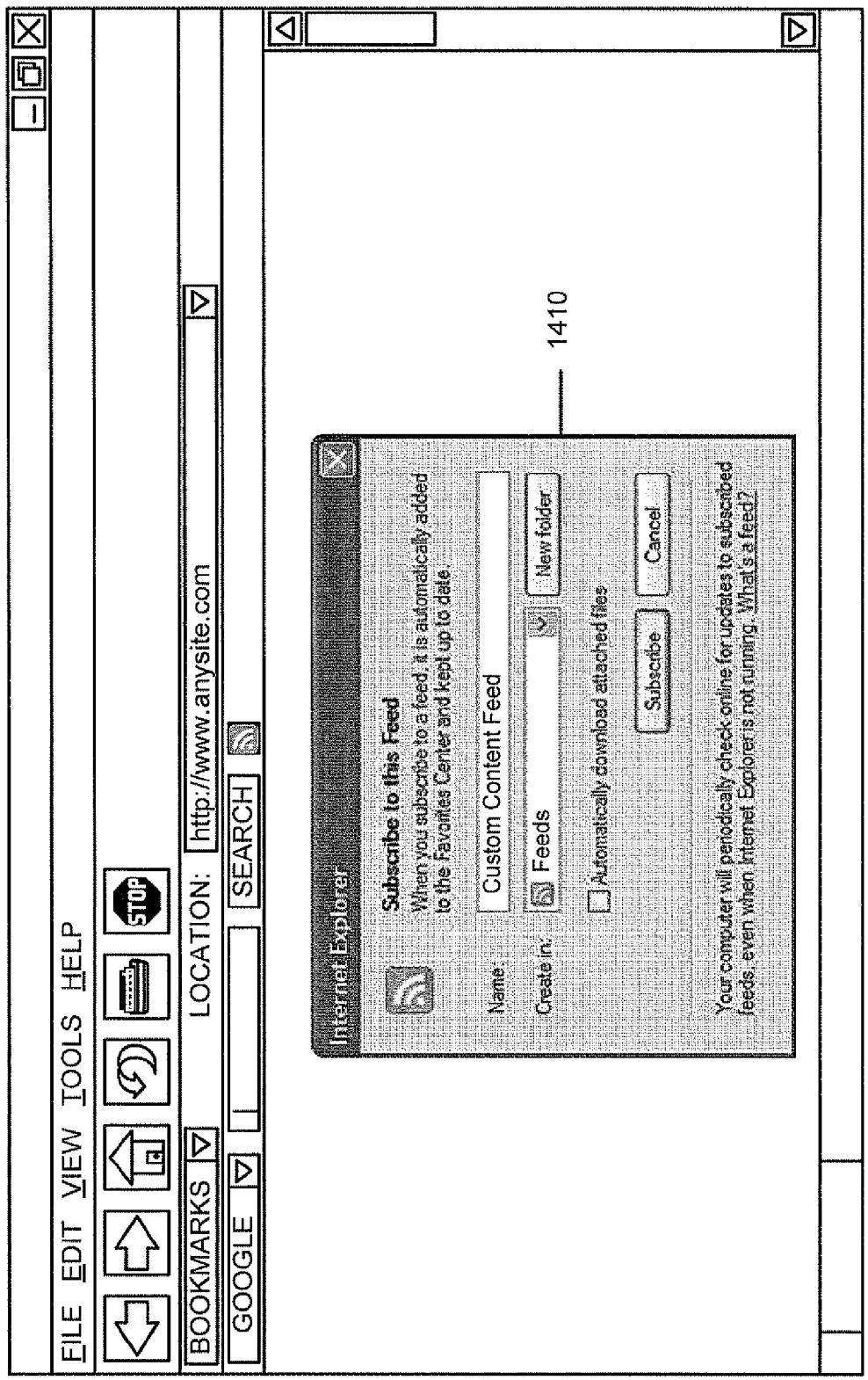
FIG. 14 is a diagram of an exemplary user interface for subscribing to a custom content feed.

The process may begin with a request to subscribe to a custom content feed being received (block 1310). The request may take different forms. For example, content searching system 210 may present the user with an opportunity to request to subscribe to the custom content feed via a web page associated with content searching system 210. Alternatively, a toolbar implemented within a browser window may provide a button, or another mechanism, via which the user can request to subscribe to the custom content feed. In either situation, as shown in FIG. 14, content searching system 210 may present the user with a user interface 1410 that may permit the user to specify that the user desires to subscribe to the custom content feed.

Figure 15:
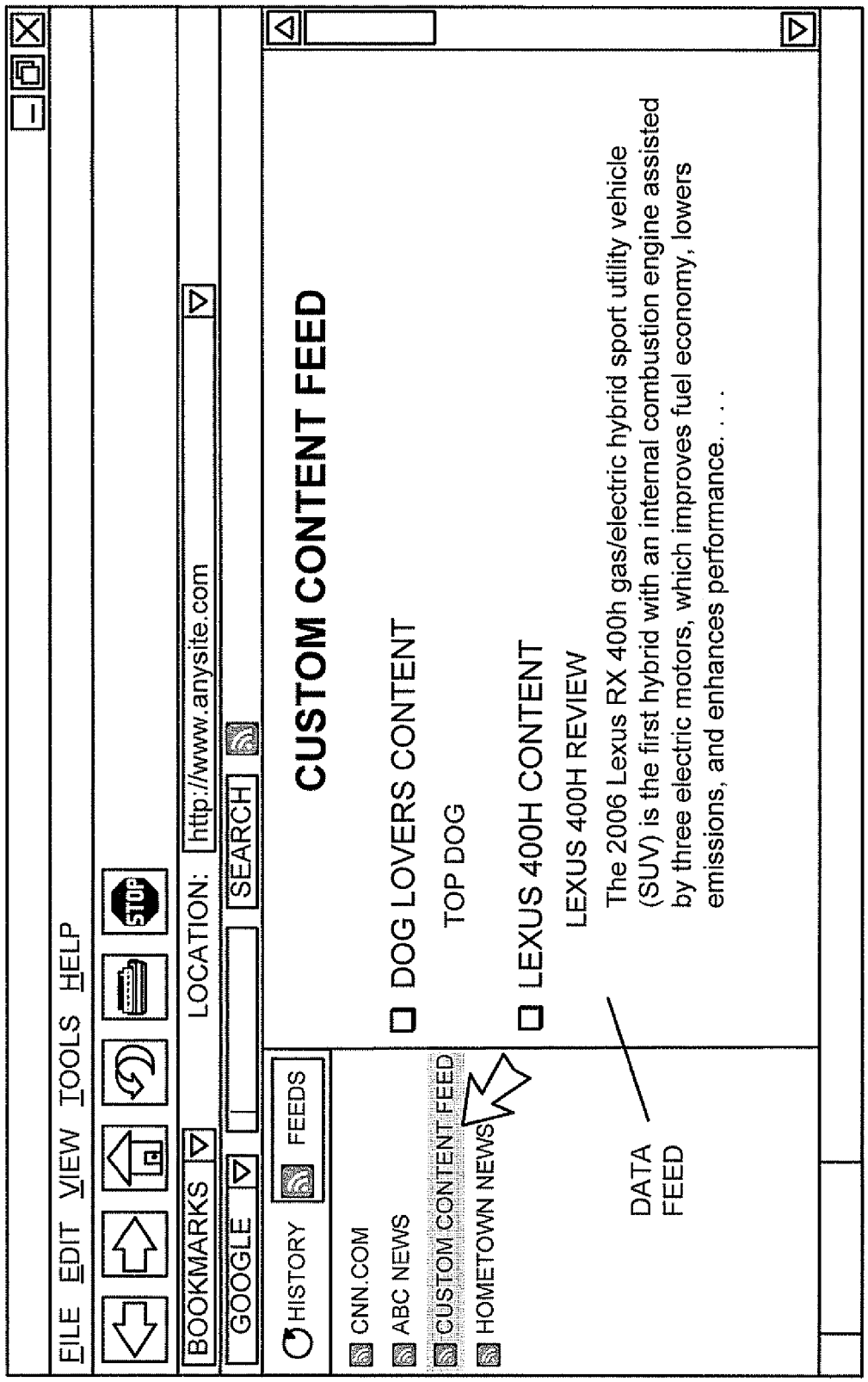
FIG. 15 is a diagram of an exemplary user interface for presenting a custom content feed.

The custom content feed may be periodically provided (block 1320). For example, content searching system 120 may periodically publish the custom content feed. The custom content feed may be read or aggregated by users that have subscribed to the custom content feed. As shown in FIG. 15, the custom content feed may include information that identifies the custom content group ("Dog Lovers Content" or "Lexus 400h Content") with which a feed item is associated. The feed item may include a title ("Top Dog") associated with the new content corresponding to that feed item. Alternatively or additionally, the feed item may include a snippet ("The 2006 Lexus RX 400h . . . ") associated with the new content corresponding to that feed item.

Selection of a custom content feed item may be received (block 1330). For example, content searching system 120 may provide a mechanism, such as a selectable button, via which the user may select one or more of the feed items.

Selective access to the custom content corresponding to the custom content feed item may be provided (block 1340). The access may be "selective" in the sense that the user may be permitted to access the custom content if certain conditions are met. To determine the conditions for permitting access to the custom content, content searching system 120 may determine whether the custom content group is freely available to everyone, whether the custom content group requires a subscription to access the custom content, and/or whether the custom content group requires a fee to access the custom content. Content searching system 120 may then permit the user to access the custom content if the custom content group is freely available, if the user has subscribed to the custom content group, or if the user has paid the required fee.

Custom Content Portal

Figure 16:
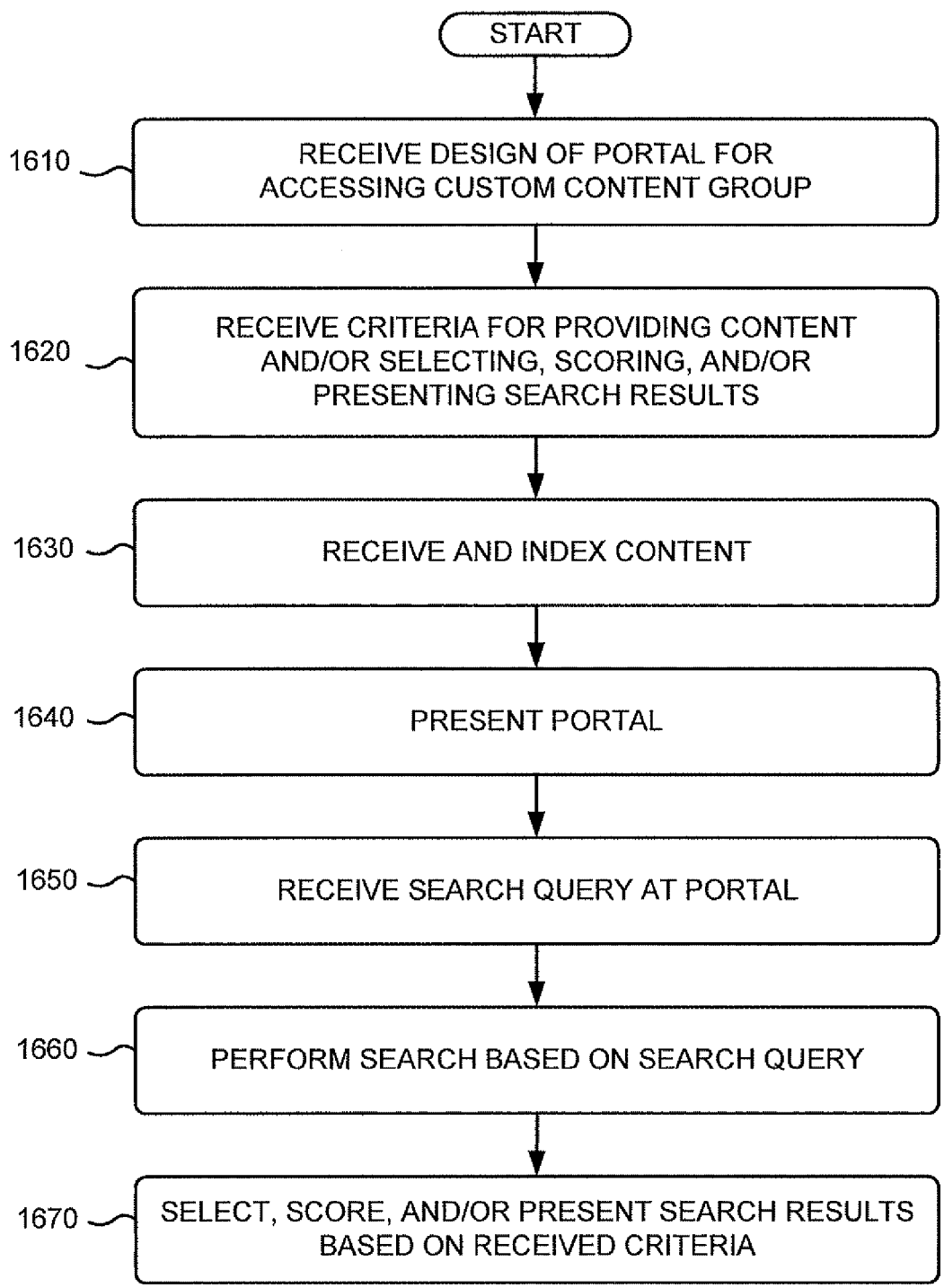
FIG. 16 illustrates a flowchart of an exemplary process for providing and searching from a custom content portal.

In yet another implementation, a custom content provider may be permitted to design a custom content portal, and specify criteria for providing, selecting, scoring, and/or presenting custom content for a custom content group. FIG. 16 illustrates a flowchart of an exemplary process for providing and searching from a custom content portal. The process exemplified by FIG. 16 may be performed by content searching system 210 or another system operating in conjunction with content searching system 210.

The process may begin with a design of a custom content portal for access to a custom content group being received (block 1610). For example, content searching system 210 may provide a user interface via which a custom content provider can design a custom content portal for access to its custom content group. The user interface may provide the custom content provider with instructions and guidance in designing the custom content portal. The custom content provider may design the look and feel of the custom content portal.

Criteria for providing content and/or selecting, scoring, and/or presenting search results may also be received (block 1620). For example, content searching system 210 may provide a user interface via which the custom content provider can specify certain criteria that may be used to influence how content can be provided, how searches are performed, and/or how search results are selected and/or presented. In one implementation, content searching system 210 may provide a list of providing criteria (e.g., criteria that may specify how content can be provided to the custom content group), selecting criteria (e.g., criteria that may specify when a document matches a search query), scoring criteria (e.g., criteria that may specify how a score is generated for a document), and/or presenting criteria (e.g., criteria that may specify how a search result document is formatted, how many search results to present, what a search result looks like, how ads are presented, etc.) that may be selected by the custom content provider. Content searching system 210 may record the content provider selections.

Custom content for the custom content group may be received and indexed (block 1630). In one implementation, the custom content provider may provide (e.g., upload and/or identify) all custom content for the custom content group. In another implementation, the custom content provider may permit users to provide content for inclusion in the custom content group. For example, the custom content provider may provide a forum-like interface via the custom content portal. Via the forum-like interface, users may be permitted to accept user uploads in the form of user posts, comments, ratings, user profiles, etc. The provided content may be indexed by, for example, custom content indexer 510 (FIG. 5) to create a custom search index 130.

Figure 17A:
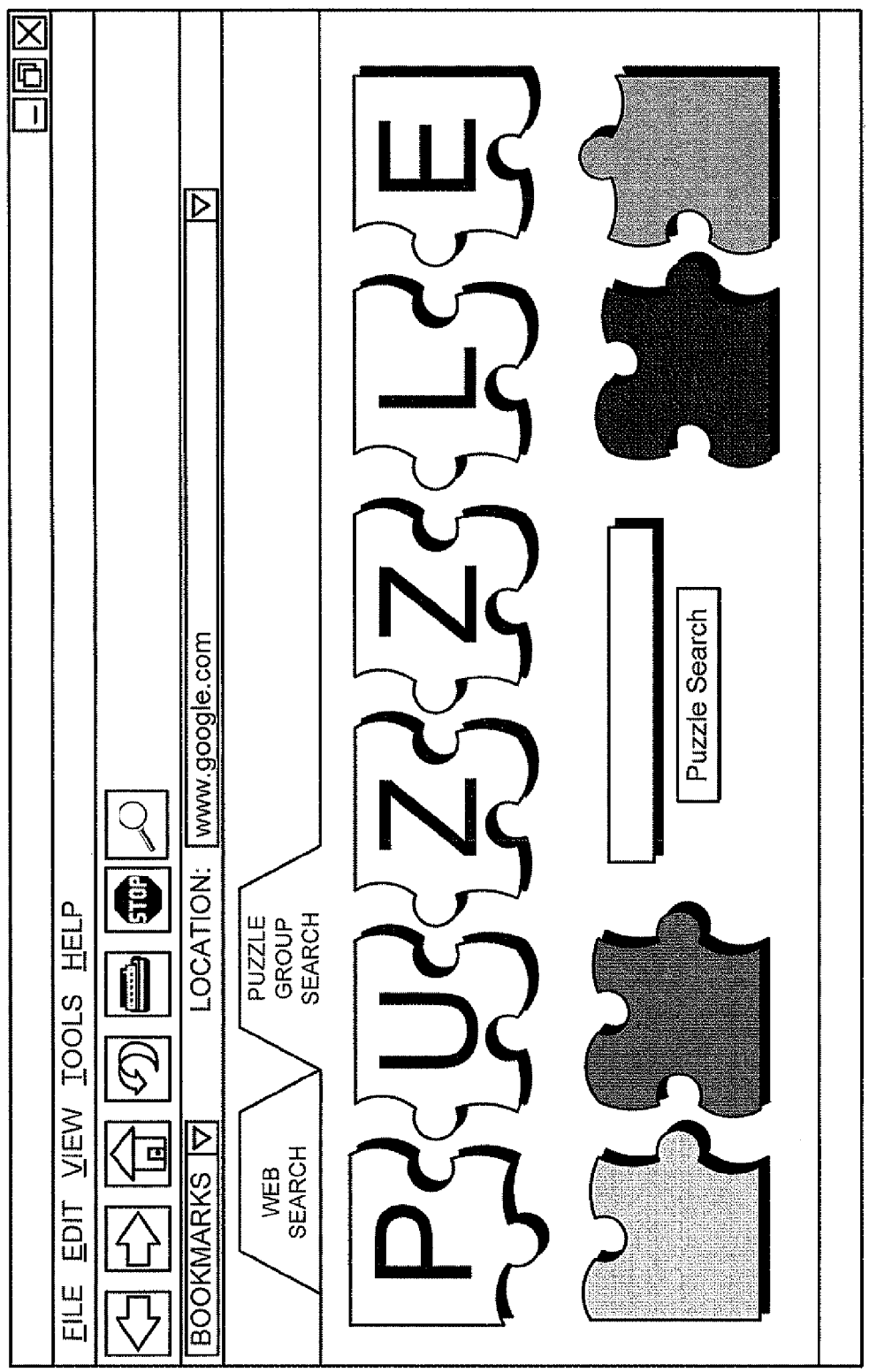
FIGS. 17A and 17B are diagrams of exemplary custom content portals.
Figure 17B:
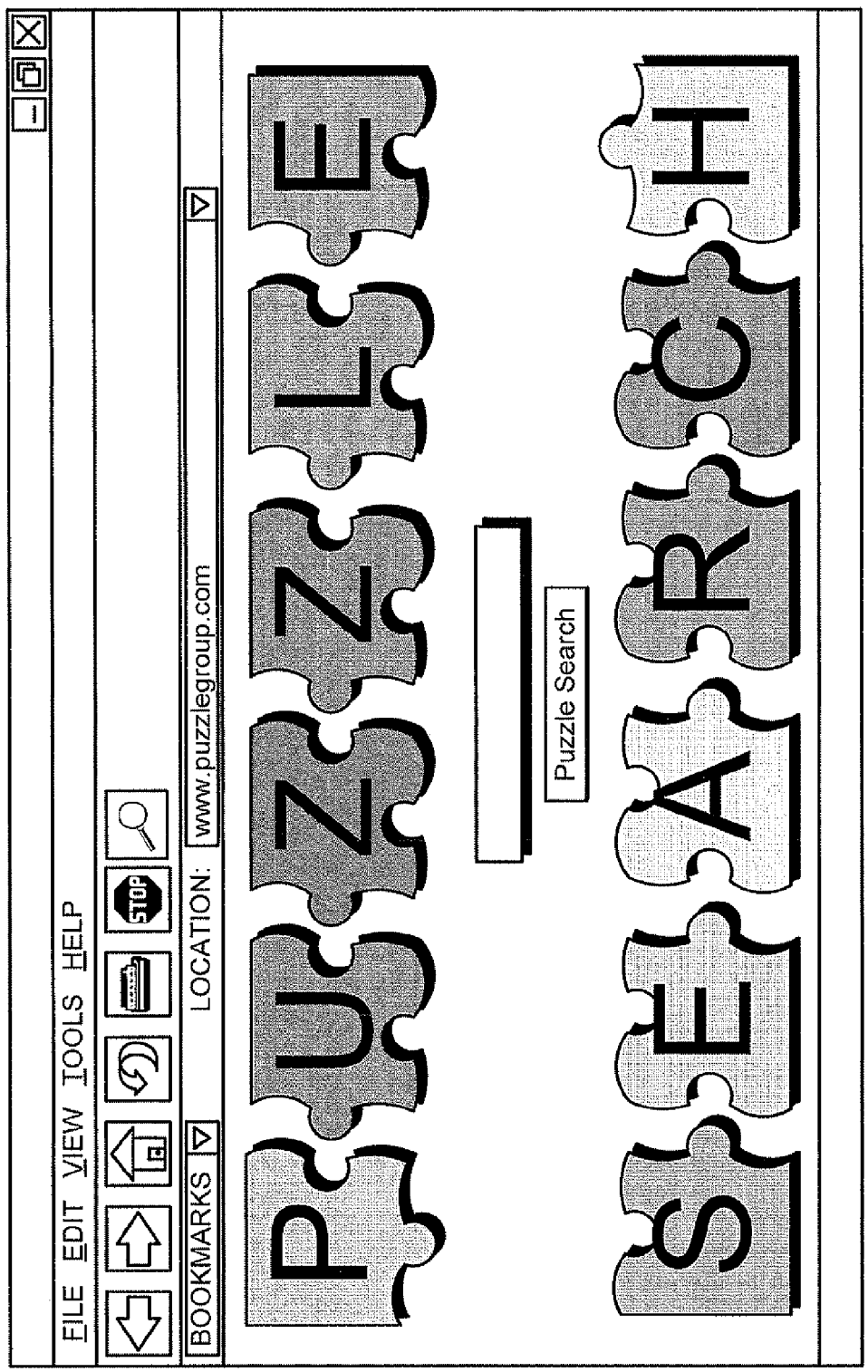

The custom content portal may be presented (block 1640). For example, content searching system 120 may permit access to the custom content portal in a number of ways. For example, the custom content portal may be accessible via a tab within a user interface provided by content searching system 120, as shown in FIG. 17A. Alternatively or additionally, the custom content portal may be accessible by entering an address (e.g., URL) associated with the custom content portal into an address box of a browser window, as shown in FIG. 17B.

A search query may be received at the custom content portal (block 1650). For example, a user may enter one or more search terms of a search query into a search box provided within the custom content portal.

A search may be performed based on the search query (block 1660). For example, content searching system 210 may search custom search index 130, corresponding to the custom content group associated with the custom content portal, to identify documents that are relevant to the search query. A document may be considered relevant to the search query when text or other data of the document matches one or more terms of the search query.

The search results may be selected, scored, and/or presented based on the received criteria (block 1670). For example, content searching system 210 may analyze the criteria provided by the custom content provider and select, score, and/or present search results based on this criteria.

CONCLUSION

Implementations described herein provide illustration and description, but is not intended to be exhaustive or to limit these implementations to the precise form disclosed. Modifications and variations are possible in light of the above teachings, or may be acquired from practice of these implementations. For example, while series of acts have been described with regard to FIGS. 7A, 7B, 13, and 16, the order of the acts may be modified in other implementations. Further, non-dependent acts may be performed in parallel.

Also, exemplary user interfaces have been described with respect to FIGS. 8-12D, 14, 15, 17A, and 17B. In other implementations, the user interfaces may include more, fewer, or different pieces of information.

Further, it should be noted that a tooltip may be associated with any for-pay custom search results that are presented. The tooltip associated with a for-pay custom search result may, when selected (e.g., by hovering a cursor over the search result), show the price for accessing the for-pay custom search result.

It will be apparent that aspects described herein may be implemented in many different forms of software, firmware, and hardware in the implementations illustrated in the figures. The actual software code or specialized control hardware used to implement these aspects is not limiting of the invention. Thus, the operation and behavior of the aspects have been described without reference to the specific software code, it being understood that software and control hardware could be designed to implement the aspects based on the description herein.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method performed by one or more server devices, comprising:
   receiving, by one or more processors of the one or more server devices and independent of any search query, a selection from a first user of one or more documents, where the one or more documents are used to form a plurality of custom content groups;
   indexing, by one or more processors of the one or more server devices, the one or more documents to form a custom search index for each of the plurality of custom content groups, where each custom search index is different from a web search index and any other custom search index associated with the plurality of content groups;
   receiving, by one or more processors of the one or more server devices and from a second, different user, a selection of one or more of the plurality of custom content groups;

receiving, by one or more processors of the one or more server devices and from a client device associated with the second user, a search query;

performing, by one or more processors of the one or more server devices and based on the search query, a search of the web search index to identify web search results;

performing, by one or more processors of the one or more server devices and based on the search query, a search of one or more of the custom search indexes associated with the selected one or more custom content groups to identify custom search results;

generating, by one or more processors of the one or more server devices, a search result document that includes the web search results, the custom search results, and a plurality of advertisements presented within at least a first area and a second area of the search result document, where the first area is distinct from the second area within the search result document, where the web search results and one or more of the custom search results are included within the first area, and where the advertisements and another one or more of the custom search results are included within the second area; and providing, by one or more processors of the one or more server devices, the search result document to the client device.

2. The method of claim 1, where receiving the selection of the one or more custom content groups includes:
determining at least one of the plurality of custom content groups that the second user is permitted to access, and
automatically selecting the at least one custom content group that the second user is permitted to access.

3. The method of claim 2, where determining the at least one custom content group that the second is permitted to access includes:
identifying a first set, of the plurality of custom content groups, that is freely available to all users,
identifying a second set, of the plurality of custom content groups, to which the second user has subscribed, and
determining that the second user is permitted to access the first set and second set of plurality of custom content groups.

4. The method of claim 1, where receiving the selection of the one or more custom content groups includes:
providing the second user with a user interface, and
receiving, from the second user and via the user interface, an identifier that identifies the one or more custom content groups.

5. The method of claim 1, where receiving the selection of the one or more custom content groups includes:
providing, to the second user, a list of available ones of the plurality of custom content groups, and
receiving the selection of the one or more custom content groups from the list.

6. The method of claim 5, where the list is provided via a toolbar of a browser application associated with the client device.

7. The method of claim 6, where providing the list of available ones of the plurality of custom content groups includes:
receiving a data feed that includes the list, and
providing, via the toolbar, the data feed.

8. The method of claim 5, where providing the list of available ones of the plurality of custom content groups includes:
providing a list of only those of the custom content groups that the second user is permitted to access.

9. The method of claim 1, where one of the custom search results includes a for-pay search result that requires payment of a fee for accessing the for-pay search result; and
where the method further comprises:
providing information, in association with the for-pay search result, that indicates the fee for accessing the for-pay search result.

10. The method of claim 1, where the custom search results include:
for-pay search results that require payment of a fee for accessing the for-pay search results, and
other search results not requiring payment of a fee for accessing the other search results; and
where generating the search result document includes:
providing the other search results with the web search results in the first area of the search result document, and
providing the for-pay search results with the advertisements in the second area of the search result document.

11. A device comprising:
a memory to store instructions; and
a processor to execute the instructions to:
receive, independent of any search query and from a first user, a selection of one or more documents, where the one or more documents are used to form a plurality of custom content groups,
index the one or more documents to form a custom search index for each of the plurality of custom content groups, where each custom search index is different from a web search index and any other custom search index associated with the plurality of content groups,
receive, from a second, different user, a selection of one or more of the plurality of custom content groups,
receive, from a client device associated with the second user, a search query,
perform, based on the search query, a search of the web search index to identify web search results,
perform, based on the search query, a search of one or more of the custom search indexes associated with the selected one or more custom content groups to identify custom search results,
generate a search result document that includes the web search results, the custom search results, and a plurality of advertisements presented within at least a first area and a second area of the search result document, where the first area is distinct from the second area within the search result document, where the web search results and one or more of the custom search results are included within the first area, and where the advertisements and another one or more of the custom search results are included within the second area, and
provide, to the client device, the search result document.

12. The device of claim 11, where the processor, when receiving the selection of the one or more custom content groups, is further to:
determine at least one of the plurality of custom content groups that the second user is permitted to access, and
automatically select the at least one custom content group that the second user is permitted to access.

13. The device of claim 12, where the processor, when determining the at least one custom content group that the second is permitted to access, is further to:
identify a first set, of the plurality of custom content groups, that is freely available to all users, identify a second set, of the plurality of custom content groups, to which the second user has subscribed, and determine that the second user is permitted to access the first set and second set of plurality of custom content groups.

14. The device of claim 11, where the processor, when receiving the selection of the one or more custom content groups, is further to:

provide the second user with a user interface, and receive, from the second user and via the user interface, an identifier that identifies the one or more custom content groups.

15. The device of claim 11, where the processor, when receiving the selection of the one or more custom content groups, is further to:

provide, to the second user, a list of available ones of the plurality of custom content groups, and receive, from the second user, the selection of the one or more custom content groups from the list.

16. The device of claim 15, where processor, when providing the list, is further to:

provide the list via a toolbar of a browser application associated with the client device.

17. The device of claim 16, where the processor, when providing the list of available ones of the plurality of custom content groups, is further to:

receive a data feed that includes the list, and provide, via the toolbar, the data feed.

18. The device of claim 15, where the processor, when providing the list of available ones of the plurality of custom content groups, is further to:

provide a list of only those of the custom content groups that the second user is permitted to access.

19. The device of claim 11, where one of the custom search results includes a for-pay search result that requires payment of a fee for accessing the for-pay search result; and where the processor is further to:

provide information, in association with the for-pay search result, that indicates the fee for accessing the for-pay search result.

20. The device of claim 11, where the custom search results include:

for-pay search results that require payment of a fee for accessing the for-pay search results, and other search results not requiring payment of a fee for accessing the other search results; and where the processor, when generating the search result document, is further to:

provide the other search results with the web search results in the first area of the search result document, and provide the for-pay search results with the advertisements in the second area of the search result document.

21. A memory device to store instructions that are executable by a processor of a network device, the instructions comprising:

one or more instructions to receive, independent of any search query and from a first user, a selection of one or more documents, where the one or more documents are used to form a plurality of custom content groups;

one or more instructions to index the one or more documents to form a custom search index for each of the plurality of custom content groups, where each custom search index is different from a web search index and any other custom search index associated with the plurality of content groups;

one or more instructions to receive, from a second, different user, a selection of one or more of the plurality of custom content groups;

one or more instructions to receive, from a client device associated with the second user, a search query;

one or more instructions to perform, based on the search query, a search of the web search index to identify web search results;

one or more instructions to perform, based on the search query, a search of one or more of the custom search indexes associated with the selected one or more custom content groups to identify custom search results;

one or more instructions to generate a search result document that includes the web search results, the custom search results, and a plurality of advertisements presented within at least a first area and a second area of the search result document, where the first area is distinct from the second area within the search result document, where the web search results and one or more of the custom search results are included within the first area, and where the advertisements and another one or more of the custom search results are included within the second area; and one or more instructions to provide, to the client device, the search result document.

22. The device of claim 21, where the one or more instructions to receive the selection of the one or more custom content groups further include:

one or more instructions to determine at least one of the plurality of custom content groups that the second user is permitted to access, and one or more instructions to automatically select the at least one custom content group that the second user is permitted to access.

23. The device of claim 22, where the one or more instructions to determine the at least one custom content group that the second is permitted to access further include:

one or more instructions to identify a first set, of the plurality of custom content groups, that is freely available to all users, one or more instructions to identify a second set, of the plurality of custom content groups, to which the second user has subscribed, and one or more instructions to determine that the second user is permitted to access the first set and second set of plurality of custom content groups.

24. The device of claim 21, where the one or more instructions to receive the selection of the one or more custom content groups further include:

one or more instructions to provide the second user with a user interface, and one or more instructions to receive, from the second user and via the user interface, an identifier that identifies the one or more custom content groups.

25. The device of claim 21, where the one or more instructions to receive the selection of the one or more custom content groups further include:

one or more instructions to provide, to the second user, a list of available ones of the plurality of custom content groups, and one or more instructions to receive, from the second user, the selection of the one or more custom content groups from the list.

26. The device of claim 25, where the one or more instructions to provide the list further include:

one or more instructions to provide the list via a toolbar of a browser application associated with the client device.

27. The device of claim 26, where the one or more instructions to provide the list of available ones of the plurality of custom content groups further include:

one or more instructions to receive a data feed that includes the list, and one or more instructions to provide, via the toolbar, the data feed.

28. The device of claim 25, where the one or more instructions to provide the list of available ones of the plurality of custom content groups further include:

one or more instructions to provide a list of only those of the custom content groups that the second user is permitted to access.

29. The device of claim 21, where one of the custom search results includes a for-pay search result that requires payment of a fee for accessing the for-pay search result; and where the instructions further include:

one or more instructions to provide information, in association with the for-pay search result, that indicates the fee for accessing the for-pay search result.

30. The device of claim 21, where the custom search results include:

for-pay search results that require payment of a fee for accessing the for-pay search results, and other search results not requiring payment of a fee for accessing the other search results; and where the one or more instructions to generate the search result document further include:

one or more instructions to provide the other search results with the web search results in the first area of the search result document, and one or more instructions to provide the for-pay search results with the advertisements in the second area of the search result document.

* * * * *